(12) United States Patent
Tucker et al.

(10) Patent No.: US 9,250,034 B2
(45) Date of Patent: Feb. 2, 2016

(54) MULTIPURPOSE FIREARM SECURING SYSTEMS, KITS AND METHODOLOGIES

(71) Applicant: Evergreen Asset Management, LLC, St. Paul, MN (US)

(72) Inventors: David Sumner Tucker, Bloomington, MN (US); Jerry Dean Boggess, Wesley Chapel, FL (US)

(73) Assignee: Evergreen Asset Management, LLC, St. Paul, MN (US)

( * ) Notice: Subject to any disclaimer, the term of this patent is extended or adjusted under 35 U.S.C. 154(b) by 0 days.

(21) Appl. No.: 13/842,886

(22) Filed: Mar. 15, 2013

(65) Prior Publication Data

US 2014/0157643 A1    Jun. 12, 2014

(51) Int. Cl.
*F41C 33/00*    (2006.01)
*F41A 23/18*    (2006.01)

(52) U.S. Cl.
CPC ............... *F41C 33/003* (2013.01); *F41A 23/18* (2013.01)

(58) Field of Classification Search
USPC ................................ 42/94, 70.11, 90; 211/64
See application file for complete search history.

(56) References Cited

U.S. PATENT DOCUMENTS

| | | | |
|---|---|---|---|
| 3,746,177 A | 7/1973 | Vilotti | |
| 4,333,385 A | 6/1982 | Culver | |
| 5,078,279 A | 1/1992 | Hancock et al. | |
| 6,042,080 A | 3/2000 | Shepherd et al. | |
| 6,155,523 A | 12/2000 | Pitre | |
| 6,637,707 B1 * | 10/2003 | Gates et al. | 248/224.7 |
| 6,793,184 B2 | 9/2004 | Dougal et al. | |
| 8,096,077 B1 * | 1/2012 | Caywood | 42/94 |
| 8,266,835 B2 | 9/2012 | Pintar et al. | |
| 8,403,278 B1 * | 3/2013 | Kasbohm | 248/206.5 |
| 2005/0115137 A1 | 6/2005 | Minneman | |
| 2005/0145585 A1 | 7/2005 | Pintar | |
| 2008/0127815 A1 | 6/2008 | Yale et al. | |
| 2010/0012691 A1 | 1/2010 | Hyle | |
| 2010/0102184 A1 | 4/2010 | Gorsuch et al. | |
| 2010/0236125 A1 | 9/2010 | Morrow et al. | |
| 2011/0167705 A1 | 7/2011 | Cauley et al. | |
| 2012/0246900 A1 | 10/2012 | Shimmel et al. | |
| 2013/0269509 A1 * | 10/2013 | Irwin | 89/37.01 |

OTHER PUBLICATIONS

StickimUp Gun Magnets (http://www.stickimupgunmagnets.com).
Magnetic Barrel Rest (http://www.battenfeldtechnologies.com).
Fastrak—Magnetic Gun and Fishing Pole Holder (http://www.outdoorconnection.com).
Barrel and Rod Safe (http://www.hunterspec.com).
2009-2013, Magnetic Gun Caddy™ (http://www.magnetguncaddy.com).

* cited by examiner

*Primary Examiner* — J. Woodrow Eldred
(74) *Attorney, Agent, or Firm* — Crawford Maunu PLLC

(57) ABSTRACT

Consistent with various embodiments, a firearm securing kit includes a barrel securing unit configured and arranged to secure a barrel of a firearm and including a securing mechanism configured and arranged to generate a holding force between the apparatus and a surface in response to an applied pressure. The kit can also include a butt plate securing unit configured and arranged to secure the butt plate of a firearm and including a securing mechanism configured and arranged to generate a holding force between the apparatus and a surface in response to an applied pressure.

20 Claims, 26 Drawing Sheets

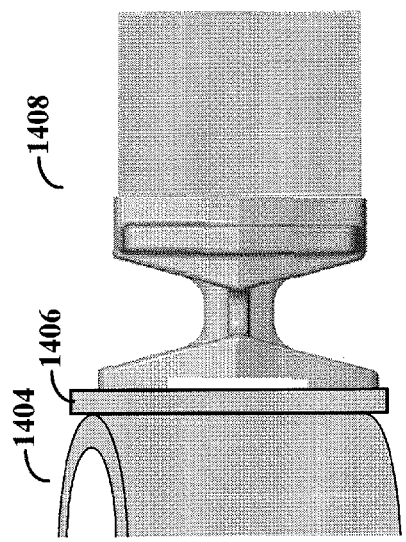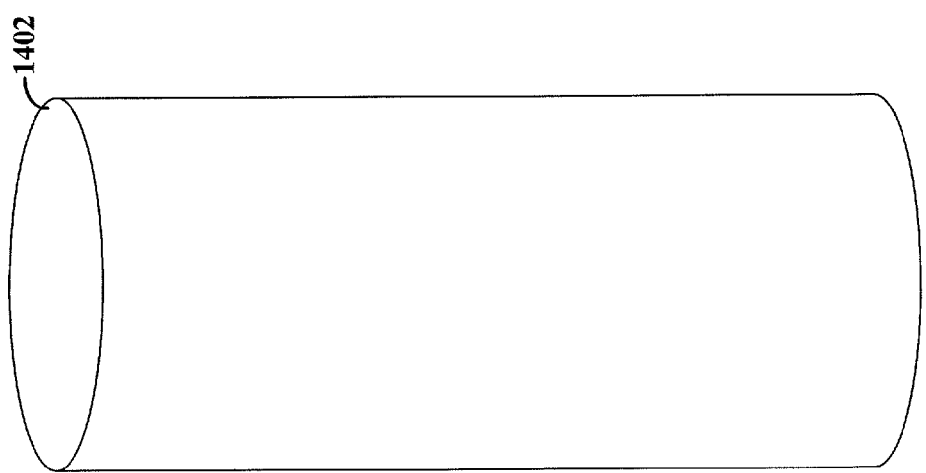
FIG. 14

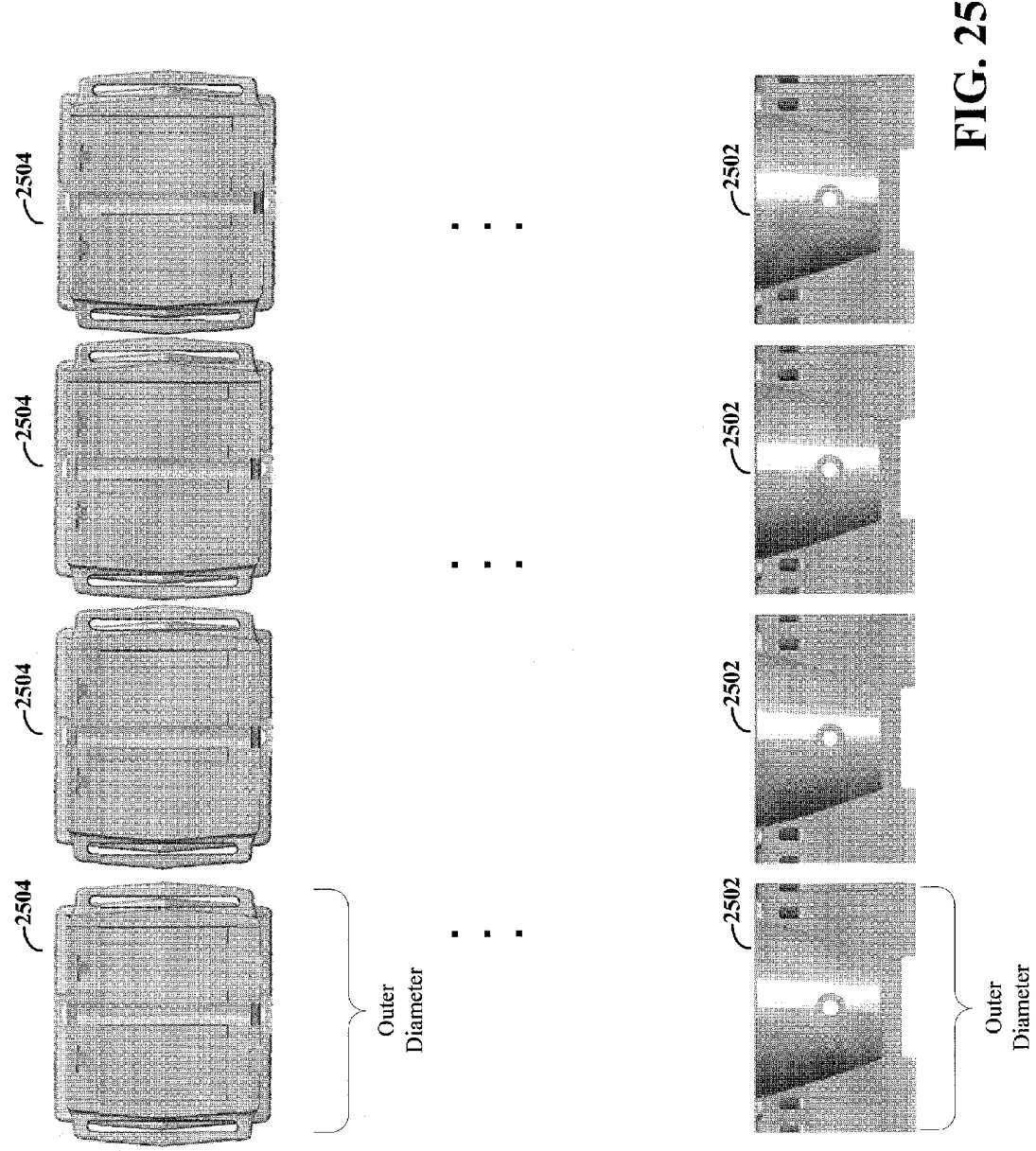

MULTIPURPOSE FIREARM SECURING SYSTEMS, KITS AND METHODOLOGIES

OVERVIEW

The aspects of the present disclosure relate generally to securing firearms, and to systems, methods, kits and devices for helping to secure small arms using a device designed with multiple mechanisms for attachment, protection and related uses.

Small arms can be categorized into long guns and hand guns. Long guns have extended lengths and are designed to be fired while braced against the shoulder. This feature along with the longer barrel and easier stabilization can increase accuracy for a shooter. The additional length, however, can make long guns difficult to carry and store. For instance, long guns can be particularly problematic when performing work in tight quarters, such as military personnel performing day-to-day activities on a naval vessel, in vehicles, aboard aircraft or even in the field. Improper storage can result in the weapons falling to the ground, striking other objects or even banging into other weapons. This can cause bent barrels, broken sights and instability of the optics, which can render the weapon unusable, inaccurate, and even unsafe. Moreover, a fallen weapon can be more difficult to retrieve, which may slow down a soldier when time may be of critical importance.

Permanently affixed storage weapon lockers and weapon racks offer adequate solutions for storing long guns. While such solutions can be useful, they require time and effort to install, and possibly prior knowledge of appropriate and effective storage locations. This is often less than ideal. For instance, soldiers may find the need to set down their weapons in unanticipated locations. Moreover, permanent solutions in multiple locations can be costly, take up valuable space and add unnecessary weight when placed on the vessels.

Soldiers also have a need to sight-in their weapons periodically. Resting the weapon barrel on a stable object can facilitate this action; however, a hard surface can damage the barrel. Accordingly, it can be difficult to find a suitable location and setup for sighting in the weapon.

Aspects of the present disclosure relate to multipurpose solutions for securing long arms and to solutions with particular usefulness in military environments. Certain aspects relate to various uses stemming from the firearm being secured by the device during activities, such as sighting, maintenance, cleaning or other acts.

SUMMARY

Aspects of the present disclosure are directed to multipurpose weapon (firearm) securing systems, kits and methods of using, that address challenges including those discussed herein, and that are applicable to a variety of applications. These and other aspects of the present disclosure are exemplified in a number of implementations and applications, some of which are shown in the figures and characterized in the claims section that follows.

Particular embodiments of the present disclosure are directed toward a multipurpose system for securing small arms. The system can be specially configured with a number of features, some of which can be particularly useful for military applications.

Consistent with various embodiments, a firearm securing kit includes a barrel securing unit configured and arranged to secure a barrel of a firearm and including a securing mechanism configured and arranged to generate a holding force between the apparatus and a surface in response to an applied pressure. The kit can also include a butt plate securing unit configured and arranged to secure the butt plate of a firearm and including a securing mechanism configured and arranged to generate a holding force between the apparatus and a surface in response to an applied pressure.

Consistent with other embodiments, a method involves the use of a firearm securing system. A barrel securing unit is attached to a first surface, while a butt plate securing unit is attached to a second surface. The barrel of a firearm is secured using the attached barrel securing unit. A butt plate of the firearm is also secured using the attached butt plate securing unit. The firearm can then be removed from the butt plate securing unit. The barrel securing unit can be removed from the first surface (whether still securing the barrel or not). The barrel securing unit is then attached to a third surface. The barrel of the firearm is then (re)secured using barrel securing unit as attached to the third surface.

Other embodiments relate to manufacturing and uses of such multipurpose systems and devices.

The above summary is not intended to describe each illustrated embodiment or every implementation of the present disclosure.

BRIEF DESCRIPTION OF THE DRAWINGS

The disclosure may be more completely understood by considering the following detailed description of various embodiments of the disclosure in connection with the accompanying drawings, which are consistent with the various embodiments of the present disclosure as follows:

FIG. 14 depicts an MPWH with a non-planar attachment surface, consistent with embodiments of the present disclosure;

FIG. 25 depicts a plurality of MPWH and MPWBH devices used together, consistent with embodiments of the present disclosure;

Figure 1:
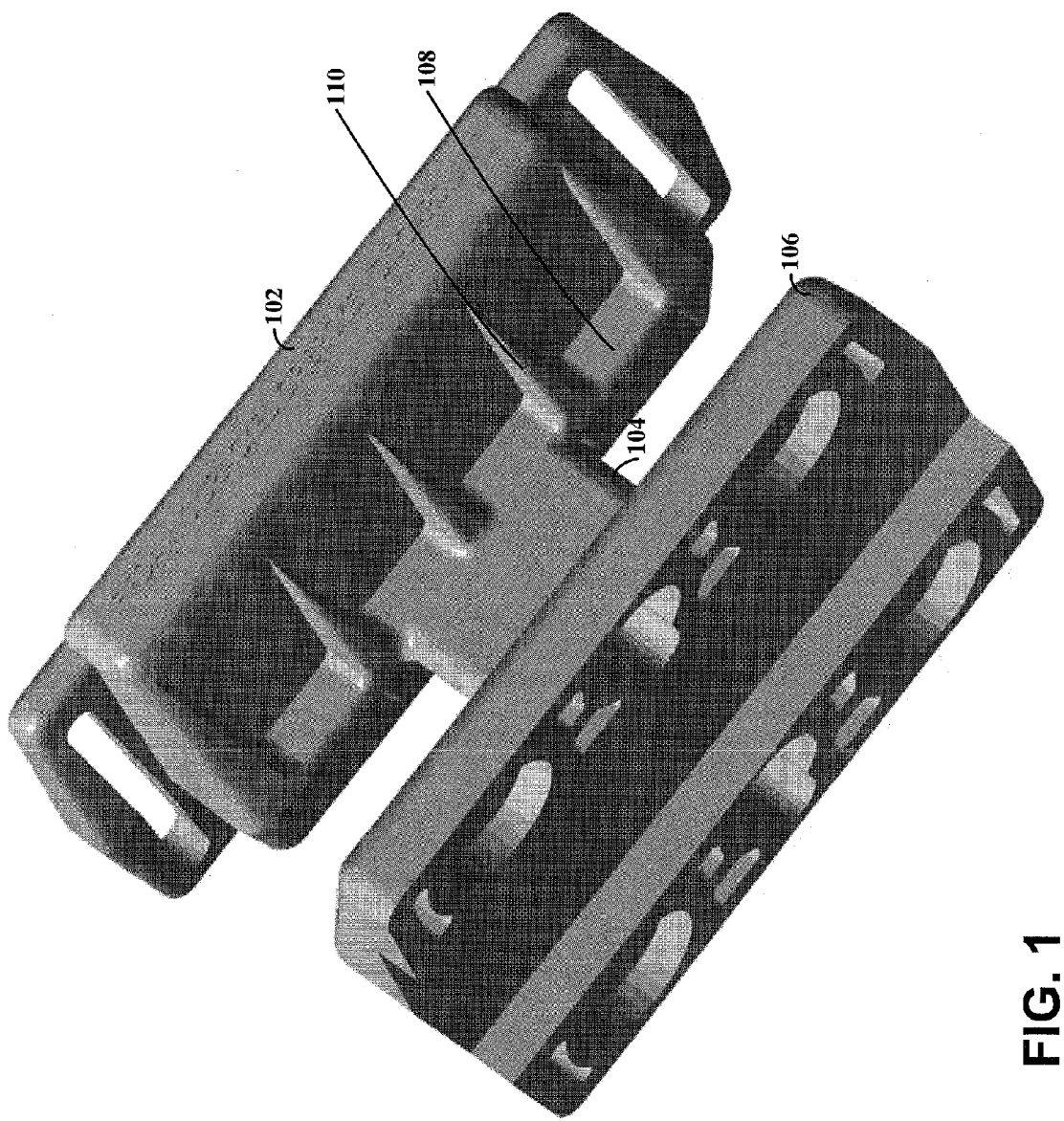
FIG. 1 depicts an experimental embodiment of a Multi-Purpose Weapon Holder ("MPWH") that includes an injection molded unit with two platforms (upper & lower) and a connecting unit between the platforms, consistent with embodiments of the present disclosure.

While the disclosure is amenable to various modifications and alternative forms, specifics of the disclosure are shown by way of example in the drawings and will be described in detail. It should be understood, however, that the disclosure is not necessarily limited to the particular embodiments described. On the contrary, the intention is to cover all modifications, equivalents, and alternatives falling within the spirit and scope of the disclosure.

DETAILED DESCRIPTION

Aspects of the present disclosure are directed to multipurpose systems and kits for securing small arms and to related approaches, uses and systems. While the present disclosure is not necessarily limited to such applications, various aspects of the disclosure may be appreciated through a discussion of various examples.

Certain aspects of the present disclosure are directed toward a system that allows small arms to be secured to a variety of different surfaces. Particular embodiments include multiple securing units and accessory components that, together, allow the device to be relocated and reused in a variety of different locations having different attachment surfaces. Certain aspects are particularly applicable to military applications and uses.

As discussed herein, the system can include two securing units, a Multi-Purpose Weapon (barrel) Holder (MPWH) device and a Multi-Purpose Weapon Butt Holder (MPWBH). Each of these securing units can be used individually; however, they can also be configured and arranged to work together as part of a cohesive system. In this context, the discussion of the individual use of each of the MPWH and MPWBH devices is not meant to be limiting.

Aspects of the present disclosure are also directed toward a kit that includes multiple components. The kit is designed to use with modular components, which can be used together and easily replaced. For instance, the MPWH device can be configured and arranged with one or more replaceable, deformable (foam) retaining pieces. Moreover, (adhesive-based) strips can be configured and arranged to function as one-half of a reclosable fastening system that can be placed on a variety of different support structures. The MPWH and MPWBH devices can then be fastened to the placed strips.

Further, different components can be replaced or modified to replace damaged components or to change the operation of the system. For instance, the deformable (foam) retaining pieces can be replaced to accommodate different needs in the field. This can include, as non-limiting examples, a different coloring (e.g., for camouflage), a different size (e.g., for different firearms) and or a different stiffness (e.g., for use in different environments).

Certain aspects of the present disclosure are directed toward a Multi-Purpose Weapon Holder (MPWH) device that allows small arms to be secured to a variety of different surfaces by securing the barrel. This MPWH device can be used alone; however, it can also be used as part of a system and/or kit. Unless otherwise stated, the various aspects of the MPWH device can be used in combination with other components of the systems discussed herein.

Particular embodiments include one or more securing mechanisms that allow the MPWH device to be relocated and reused in a variety of different locations having different attachment surfaces. Certain aspects are particularly applicable to military applications and uses.

Embodiments are directed toward a MPWH device that facilitates aiming of small arms while also securing and providing protection for the barrel. The MPWH device can be configured to allow for the firearm to be canted in different directions so that it can be aimed, while also providing support and stability. A carefully-designed support structure cushions the barrel to help reduce potential damage that can result from the recoil of the firearm.

Consistent with embodiments discussed in more detail herein, a device includes two major faces or platforms. The use of two separate platforms (connected by a thinner support piece) can be useful in a number of different settings. Embodiments of the present disclosure are directed toward uses, improvements and/or supplements for a two-platform structure.

According to certain embodiments, a first platform can be configured to interface with a structure such as a wall. This first platform can include one or more attachment mechanisms for allowing the device to be attached, removed and reattached to different structures and in different positions and locations. Thus, certain embodiments include multiple attachment mechanisms, each of which may be suitable in different situations and for different structures. For example, military personnel may carry a portable MPWH device in order to secure a firearm in a wide variety of locations, and/or in order to stabilize the firearm during use, all with a quick setup time and while allowing a firearm to be seized at a moment's notice.

The attachment mechanisms can include well-known solutions, such as magnets. Consistent with these approaches, magnets can be placed in recessed cavities, as shown in several references such as U.S. Pat. No. 6,155,523 (discussing a magnet within a recessed casing) and U.S. Pat. No. 6,793,184 (discussing a magnetic attachment using countersunk magnets and recessed portions), each of which is fully incorporated herein by reference. The use of recessed cavities can facilitate flush placement of the device against a metal surface and/or maintain an air gap between the magnet and the magnetic surface to which the device is attached. While this well-known attachment mechanism has its uses, it has been discovered that other attachment options may be desirable, particularly in certain military applications, e.g., due to the fact that certain military vessels and vehicles use non-ferromagnetic materials. Accordingly, embodiments are directed toward various types of specialized attachment solutions, which can be used alone or in combination.

The second platform can be configured to include a deformable weapon/firearm securing portion. This securing portion can be configured and arranged to allow the barrels of different firearms to be secured to the device. For instance, the deformable portion can include a (curved) cavity that is sized and configured to secure the barrel of the firearm. The deformable aspect can form an opening to the cavity that is smaller than the barrel of the firearm, but that elastically deforms with pressure so as to allow the barrel of the firearm to traverse the opening. After insertion of the barrel, the deformable portion then returns to its original form, thereby securing the firearm. Particular embodiments of the present disclosure are directed toward a device that includes a deformable portion that provides resistance sufficient to prevent unintentional dislodging of the firearm from the deformable portion by minimal force (e.g., by movement of a vehicle/vessel/aircraft). Moreover, the MPWH can be designed such that the force required to dislodge or remove the firearm from the MPWH device is less than the force required to remove the MPWH device from a support structure. This arrangement allows a person to use the firearm without first removing the MPWH device from a support structure. A person wishing to remove or move the MPWH device can do so after removing the firearm and by applying additional force. Thus, the securing mechanism can be configured to provide sufficient holding force to allow the firearm to be removed, but not so much as to prevent or make it difficult for a person to remove the MPWH device from the support structure using the strength in their hands.

Consistent with certain embodiments, a strap can be used to provide additional holding strength. This can be particularly useful when there are significant external forces (e.g., from movement of motor vehicles, aircraft, naval vessels, etc.). Moreover, the MPWH device can also be designed to remain on the firearm as it is removed from a support structure. For instance, a solider may need to quickly access the firearm that is secured to a wall using magnets (or a reclosable fastener system) on the MPWH. If the strap is employed, the solder can simply grab the firearm to disengage the magnets from the wall, while leaving the MPWH strapped to the barrel. This may also be advantageous when the soldier needs to take his firearm to a new location, but simply does not want to take the extra time to remove the MPWH from the barrel.

The light-weight construction and relatively small size of the MPWH can reduce any adverse effects caused by leaving the MPWH on the barrel. Moreover, as discussed in more detail herein, the MPWH's multiple platform design can be particularly useful for providing a platform to stabilize the firearm during aiming. Thus, there are many situations where it can be desirable to leave the MPWH on the barrel.

The MPWH can be designed for attachment to a wide variety of different structures. A few non-limiting example structures include walls, floors, ceilings, doors, windows, vehicle panels, trees, rocks, boats, airplanes, wheels, sheds, cabinets, boxes, chairs, tables, desks, armored vehicles, fences, utility poles and more. For ease of discussion, the identification of a particular type of structure (e.g., a wall) will be understood to not be limiting unless otherwise stated.

Particular embodiments of the present disclosure are directed toward the contacting portion of the bottom platform being substantially planar, i.e., the portion that attaches to the support structure. A planar configuration conforms to numerous surfaces, even surfaces that are themselves not perfectly planar. The bottom platform, of other embodiments, has a non-planar interface, an example of which would include a curved interface. This can be particularly useful for attachment of the device to poles and similar objects. Another embodiment can be shaped as an L-bracket, which can be particularly useful when the device is placed at the corners of exterior walls or at the top of a wall, among other places. Other variations of the platform configuration are also possible.

The bottom platform can also be configured to include graspable portion(s) or handle(s) that can be used when securing the MPWH device to a structure and also when removing the MPWH device from the structure. The distance between the two platforms (which is partially defined by the length of the support piece connecting the platforms) can be sufficient to allow a person to grasp the platform and/or graspable portion while the device is flush with a flat surface. This distance can be configured such that a person will have enough leverage to remove the device using only his/her hands. Moreover, space between the platforms can be provided in order to facilitate attachment of the device to a wall or similar structure. This type of configuration can be particularly useful for an adhesive-like securing mechanism that requires a rocking motion and pressure to fully engage.

Consistent with certain embodiments, the MPWH configuration can facilitate canting of the firearm in multiple directions to allow it to be aimed and discharged (e.g., to adjust sights on the firearm or even during combat situations). For instance, the MPWH can facilitate canting of the gun by providing a raised platform that can easily tip backwards and forwards (using a rocking motion), and that can easily be rotated left to right. (With the latter design, the bottom platform is left unattached.) This tipping action can be facilitated by providing sufficient distance between the two platforms, which results from a support piece having suitable length. Further canting can be facilitated through the use of two separate deformable pieces that are designed to allow for some movement of the barrel within the MPWH. In addition, canting can be further facilitated by providing moveable joint(s) between the two platforms. With this design, each platform can move independently from the other platform, at least to the extent allowed by the joint(s).

In certain embodiments of the present disclosure, the device includes a leverage point in the form of an opening or protrusion that allows a tool to be inserted between the device and a wall or other structure. In particular, the leverage point allows the user to dislodge the device from a wall by inserting a lever that provides mechanical force between the wall and the device. For instance, the leverage point can be designed to accommodate readily available equipment, such as a multi-tool or a knife blade. The leverage point can be provided with additional support and/or reinforcement to withstand the force used to remove the device from an attached structure. Such support may include additional thickness in the platform near the leverage point and/or plating the leverage point with a sturdy material, such as metal.

Consistent with various embodiments, the top of the lower platform and the bottom of the upper platform can be ergonomically designed to allow the user to quickly and comfortably engage or disengage the MPWH unit using one or more of the attachment mechanisms, which may include adhesives, interlocking materials (e.g., hook and loop, Power-Grip Pedalboard, PaiGrip and/or Dual Lock), magnets or key slots. The open space between platforms permits a firm grip on both platforms and support stem, even when wet. The space between the platforms may also allow for storage of an optional hook and loop (Velcro) strap when not in use.

In certain embodiments, a specially-designed tool can be designed into the molded device. For instance, the device can include an integrated extension member that provides additional leverage for removal of the device from a wall or similar structure.

In other embodiments, the tool can be provided as a separate item. For instance, the tool can take the form of a curved bar where the curved portion is designed to act as a fulcrum point (against a wall) when one end of the tool is in contact with the leverage point. This bar can be carried separately from the device. In other embodiments, the device can include a holding mechanism for storing the tool when it is not in use. The tool can then be removed and used whenever the device is to be removed from a wall or other structure.

Various experimental devices and related uses are discussed hereafter. These experimental features provide support for numerous different embodiments and are not meant to be limiting.

FIG. 1 depicts a base unit for an experimental embodiment of a Multi-Purpose Weapon Holder ("MPWH") that includes an injection molded unit with two platforms (upper & lower) 102, 106 and a connecting unit 104 between the platforms, consistent with embodiments of the present disclosure. The surface of each platform 102, 106 can be configured with extra support structures to provide additional strength while minimizing weight and material cost. For instance, one or more of the platforms 102, 106 can be configured to include a center stabilizing bar 108 and a series of multiple (e.g., five) buttresses 110 on either side of the stabilizing bar 108. This design can be particularly useful for allowing the MPWH to be both lightweight and strong.

Figure 2:
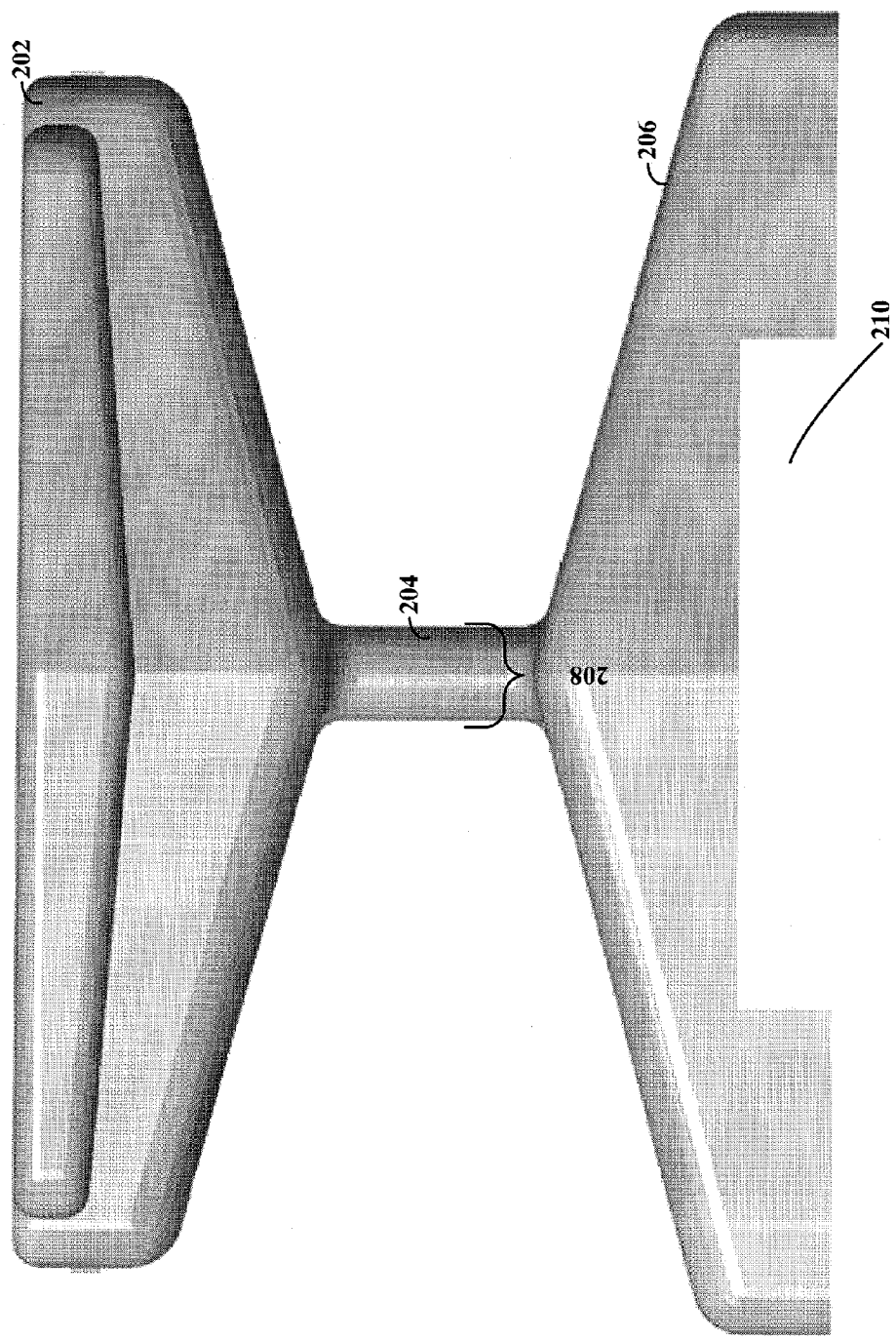
FIG. 2 depicts a side view of the MPWH in which the connecting/support between the platforms is shown, consistent with embodiments of the present disclosure.

FIG. 2 shows a side view of a base unit for the MPWH in which the connecting support 204 between the platforms is shown, consistent with embodiments of the present disclosure. The support 204 connects the two platforms 202 and 206. As shown, the support 204 can extend between the two platforms and in the direction not visible in FIG. 2, while being comparatively thin in the visible direction 208. This configuration facilitates gripping of the upper platform 202 while the device is attached to a structure at the lower platform 206. Moreover, the distance between the two platforms allows leverage to be applied with a rocking motion on the device, which can be useful for both securing the device to the structure and subsequent removal. Channel/slot 210 in the platform 206 can be filled with an adhesive-like material (e.g., hook and loop, Power-Grip Pedalboard, PaiGrip and/or 3M Dual Lock®) to permit attachment of the device to many different types of surfaces.

In certain embodiments, channel 210 is filled with a fastener material (not shown) that interfaces with another opposing material. This fastener material may be reclosable, adhesive-backed, flexible fasteners consisting of continuous fields of plastic stems with mushroom-shaped plastic heads, which tightly interlock when pressed together. For instance, PaiGrip or 3M Dual Lock® can be used as the fastener material. For example, a section of the Dual Lock material can be affixed to a wall at a desired location, while being sized and configured to interface with a corresponding section of the fastener material attached to the device.

Figure 3:
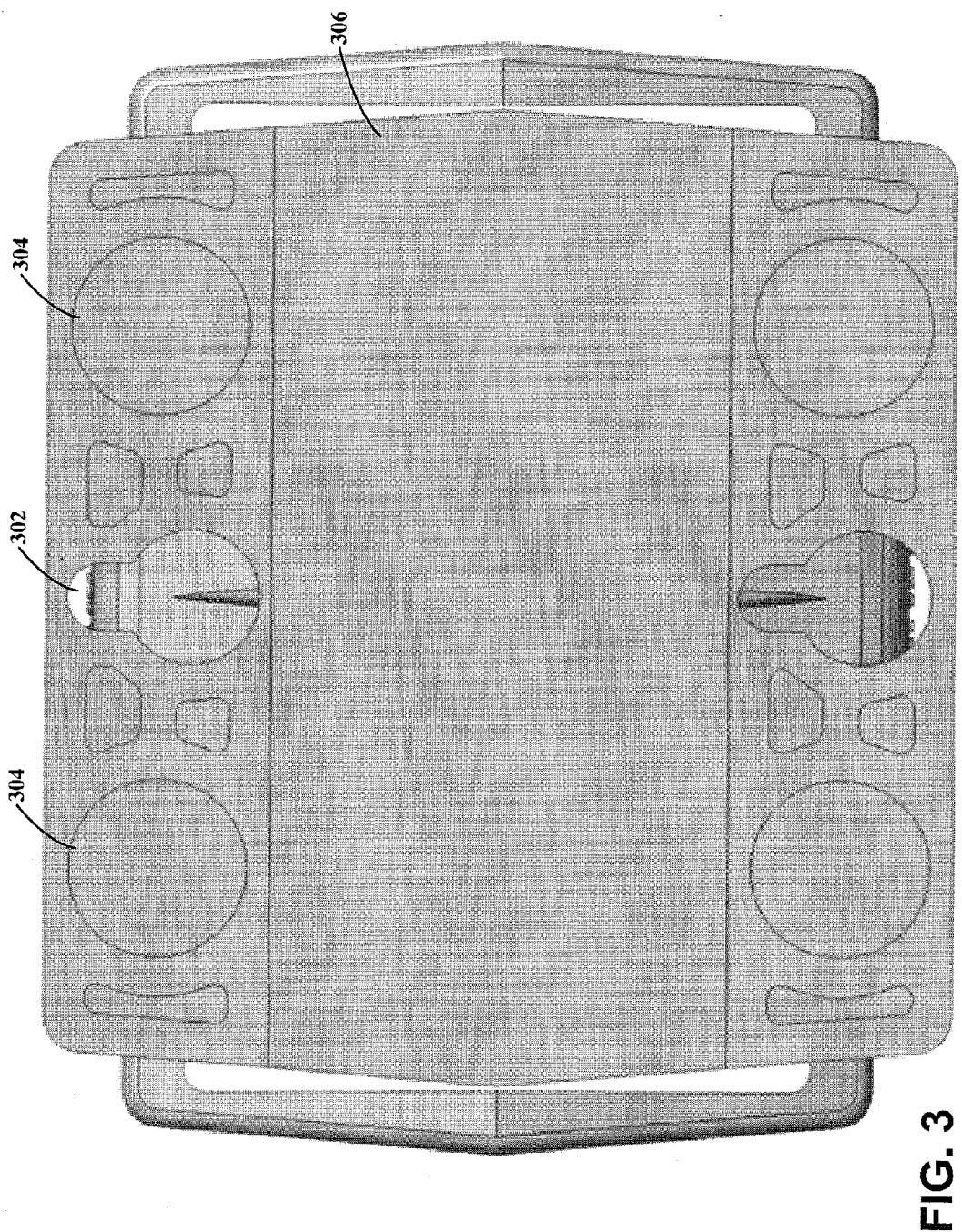
FIG. 3 depicts a view of the underside of the lower platform of the MPWH, consistent with embodiments of the present disclosure.

FIG. 3 shows the underside of the lower platform of the MPWH, consistent with embodiments of the present disclosure. The lower platform can be configured with one or more features designed to provide attachment options for securing the device to a wall or similar structure. As non-limiting examples, the attachment mechanism can include an adhesive-type material (e.g., hook and loop, Power-Grip Pedalboard, PaiGrip and/or 3M Dual Lock®), which is placed in a channel 306 that is located in the lower platform. The attachment mechanism can also be configured to adhere in the location of one or more key slots 302. In some instances, magnets can be placed in depressions 304. These attachment mechanisms can be combined with a gripping material, such as a material that is configured to resist shearing forces that are parallel to the support structure (e.g., downward pressure when attached to a wall).

Figure 4:
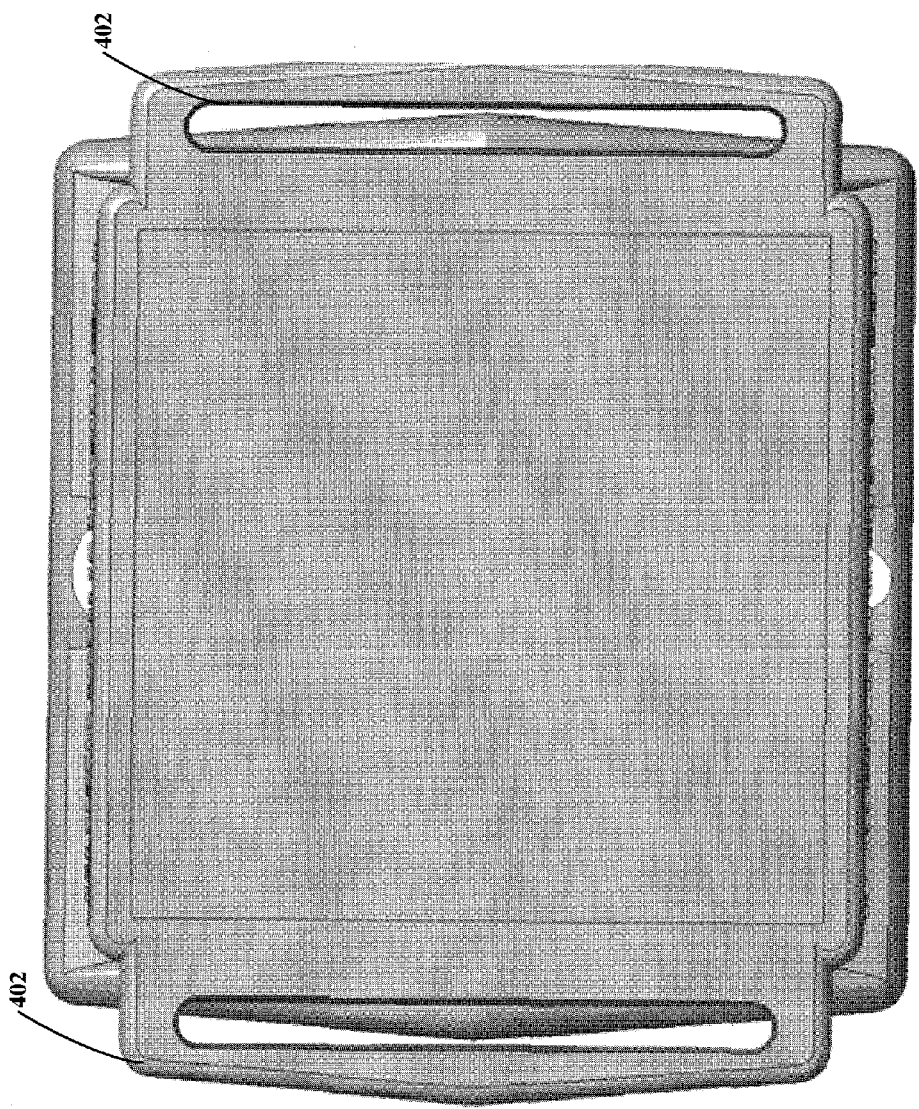
FIG. 4 depicts a top down view of the underside of the upper platform of the MPWH, consistent with embodiments of the present disclosure.

FIG. 4 shows a top down view of the upper platform of the MPWH, consistent with embodiments of the present disclosure. The upper platform can be configured to include extension elements 402 that serve dual purposes: providing a slot for inserting a strap or other attachment mechanism, and providing a graspable structure for the user of the device. In certain embodiments, a strap can be inserted into the slots of extension elements 402. This strap can include a Velcro strip or a snap that can be used for storing the device when not in use. This can be particularly useful for allowing a soldier to store the device on their clothing or carried equipment. The extension elements 402 can also facilitate attachment and removal of the device from a wall or other structure by providing a graspable extension for applying additional leverage, if necessary.

Figure 5:
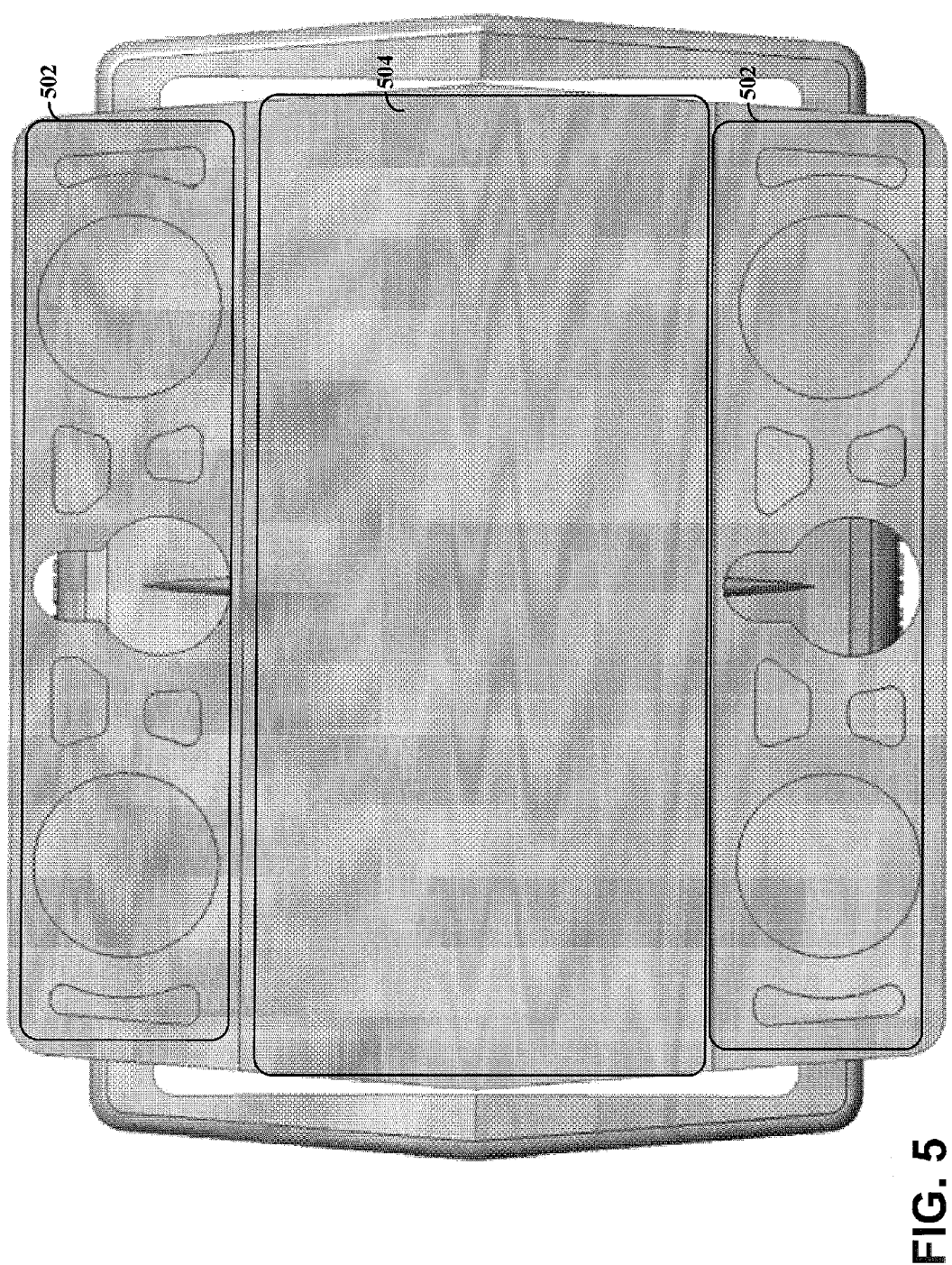
FIG. 5 depicts a top down view of the lower platform of the MPWH with an adhesive-like material and gripping material, consistent with embodiments of the present disclosure.

FIG. 5 shows a view of the bottom side of the lower platform of the MPWH with an adhesive-like material and gripping material, consistent with embodiments of the present disclosure. As shown in FIG. 5, adhesive-like material 504 can be placed in one or more slots. In certain embodiments the adhesive-like material can be a fastener material such as the 3M Dual Lock®. In other embodiments, the adhesive material may be in gel, liquid, foam or cream form, and may be reapplied as necessary. The location and configuration of the gripping material will depend upon the mechanical interface between the material's components. In one instance, the adhesive-like material can be placed in the center of the slot at location 504. The gripping material can be placed at locations 502. Other configurations are possible, including but not limited to, patterning of the gripping material and the adhesive-like material. In addition, various different types of adhesive materials can be used (e.g., the type of adhesive material being customized or tailored depending upon the different types of support structures or substrates). In certain instances, the gripping material can be placed within a recess of the platform. This can be particularly useful in the event that attachment is also provided through the use of one or more magnets that require close contact with a wall or similar structure.

Embodiments of the present disclosure allow for gripping material to be over-molded directly into the platform at locations 502 and 504. This can cover one or more of the recesses so as to provide additional surface area for the gripping material to interface with an attached surface. For example, the over-molding can cover all areas of the platform's surface—other than the locations of the two key slots and/or two magnets in opposite corners of the lower platform.

Consistent with certain embodiments, a directional gripping material can be applied to the lower platform. This can be particularly useful to ease removal of the device while providing gripping action in the most problematic direction. For instance, the gripping material could be oriented to resist downward movement caused by gravity, while allowing the device to easily slide in an upward direction for its removal from the structure.

Other embodiments of the present disclosure recognize that it may not be desirable to have multiple attachment mechanisms being used concurrently. For instance, if the MPWH device is placed on a ferromagnetic wall, the combination of a magnet coupled with an adhesive, may require a detachment force that exceeds the desired range (e.g., relative to human hand strength). Accordingly, certain embodiments of the present disclosure permit the user to temporarily disable one or more attachment mechanisms. As a non-limiting example, a thin (plastic) covering piece can be provided to cover the adhesive portion of the MPWH device. The covering piece can prevent the adhesive from sticking to a wall or similar structure, while still allowing another attachment mechanism, such as magnets, to operate as the primary attachment mechanism. The covering piece can also protect the adhesive portion from exposure to dirt or other contaminants which might be on the wall or in the air. The covering piece may also protect the adhesive portion from damage or wear while the MPWH is not in use. In one instance, this covering piece can be held in place by the adhesive portion itself. In other instances, the covering piece can snap or slide into place.

Figure 6:
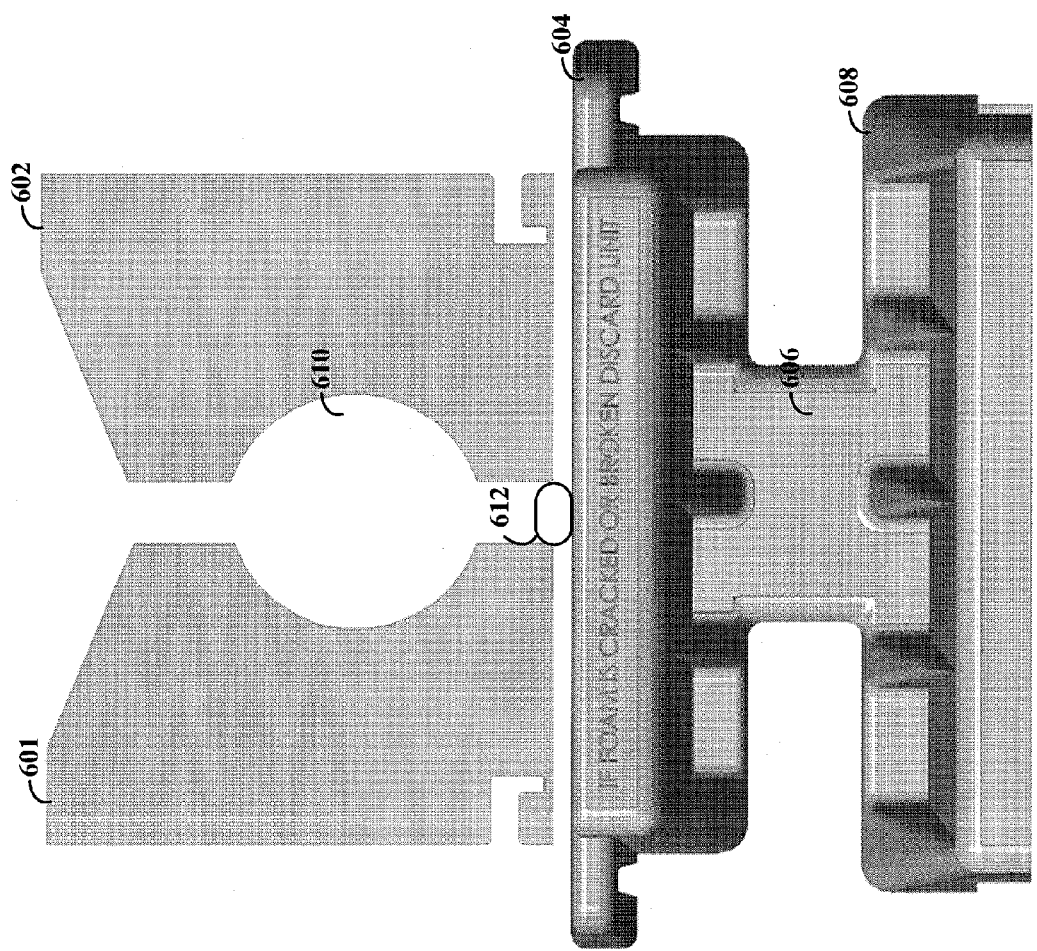
FIG. 6 depicts a front view of the MPWH in which a deformable component is attached to the upper platform, consistent with embodiments of the present disclosure.

FIG. 6 depicts a front view in which a deformable component is attached to the upper platform, consistent with embodiments of the present disclosure. FIG. 6 depicts elastically deformable components 601, 602 attached to the upper platform 604 of an MPWH device. The MPWH device can be attached to a wall or similar structure using attachment options located on the lower platform 608. Support unit 606 connects the two platforms.

Together, deformable components 601, 602 form a cavity 610 that is designed to secure the barrel of a firearm. For instance, an example dimension of about 0.75 inches diameter may be suitable for a 20 gauge firearm. These deformable components 601, 602 are configured to change position or shape in response to the barrel of a firearm being pressed into the opening. When sufficient pressure is applied, the deformation will be sufficient to allow the barrel of the firearm to enter the cavity 610. After insertion of the barrel, the deformable components 601, 602 return to their original shape and position and thereby hold the firearm within cavity 610.

With certain embodiments, the deformable components 601, 602 are configured to provide resistance sufficient to prevent a firearm from being dislodged from the opening 610 by expected forces (e.g., by movement of a vehicle/vessel or by light jostling from people or objects). The use of an optional strap can provide further resistance. Moreover, the force required to dislodge the firearm from the MPWH device can be set to a value that is less than the force required to remove the MPWH device from support structure. This allows a person to use the firearm without removing the MPWH device from the wall or other structure. For instance, the size of the cavity 610 can be changed to increase or reduce the resistance. In addition, the type of material of the deformable components 601, 602 can be modified. This can include the use of deformable components that are designed to keep the MPWH on the barrel in a more permanent fashion. In particular, the required removal force can be set at a relatively high level, such that the MPWH can be removed from an attached structure by pulling on the firearm.

Particular embodiments of the present disclosure relate to different materials and/or structures for the deformable components 601, 602 in order to provide different resistances depending on whether the firearm is being inserted or removed from the cavity 610. For instance, a directional adhesive material can be used to facilitate insertion of the firearm into the device, while at the same time resisting removal of the firearm.

The device depicted in FIG. 6 can also include (optional) material 612, which is located between the deformable components 601, 602. In certain embodiments, this material can be configured to facilitate use of a firearm while the barrel stays positioned between the deformable components. For instance, the material 612 can be designed to provide stability to the firearm during aiming and also cushion the barrel from impacts caused by firearm recoil.

In certain embodiments, the deformable components 601, 602 and the material 612 can be designed such that the firearm does not normally touch the material 612 unless significant force is applied to the firearm in the direction toward the material 612. This type of force may be caused, for example, by the firearm recoil.

The exterior edges of the top surface of the upper platform form a frame to create a short well or depression on the top of the platform. The well can be used to seat and attach deformable elements, such as a 2"×2"×1.75" sheath of flame-retardant, closed cell, polyethylene foam. The foam can be attached to the platform with either appropriate liquid glues or double-sided foam tape. The foam sheath can thereby be used to accommodate and protect the barrels and sights of a weapon.

Figure 7:
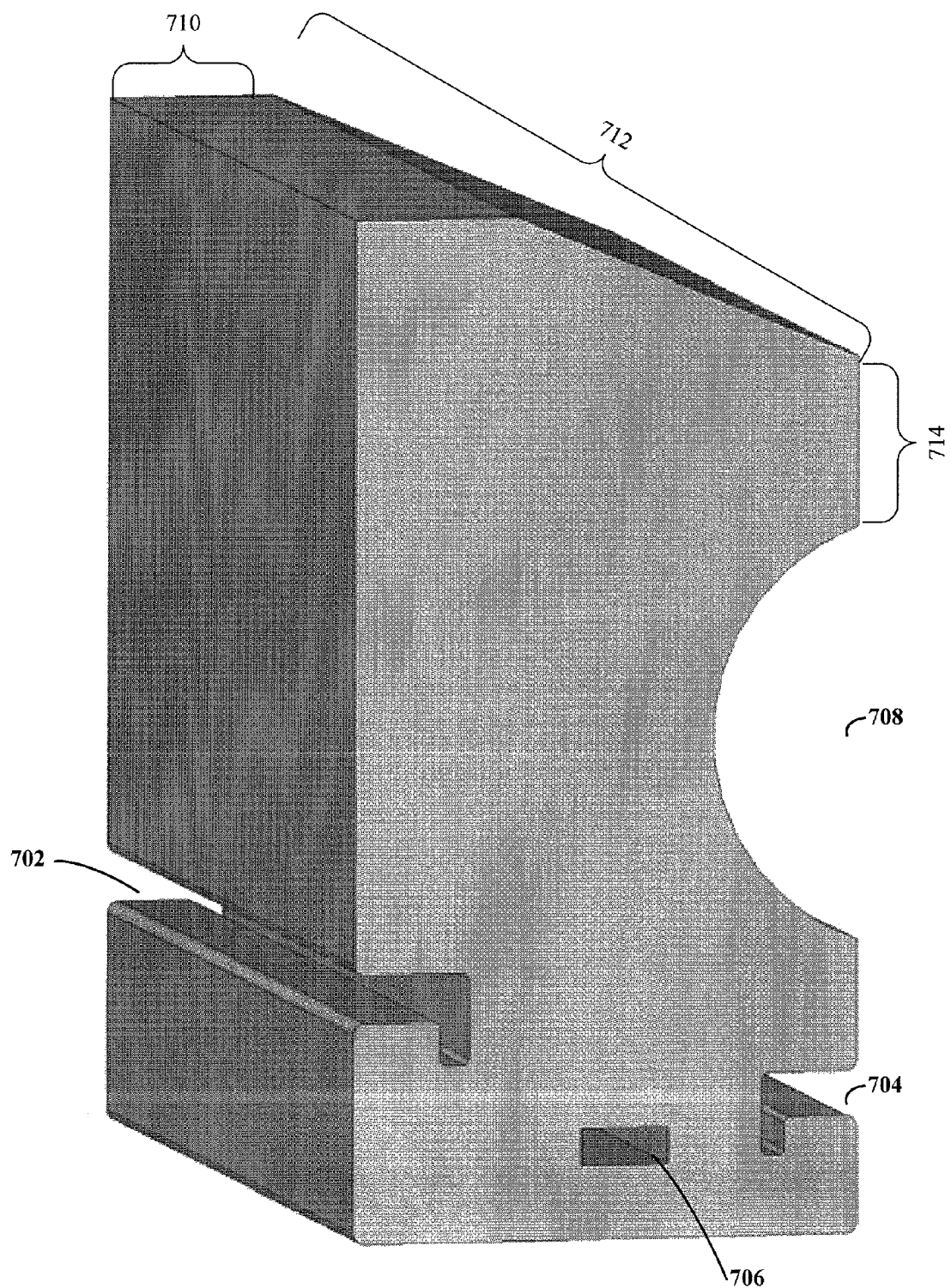
FIG. 7 depicts a deformable piece that is configured and arranged to be used with an MPWH device, consistent with embodiments of the present disclosure.

FIG. 7 depicts a deformable piece that is configured and arranged to be used with an MPWH device, consistent with certain embodiments of the present disclosure. Similar to the design shown in FIG. 6, two deformable pieces can be positioned to create a cavity 708 that can accommodate the barrel of a firearm.

As discussed herein, one or more deformable pieces can be attached to the base unit using adhesive materials. The deformable piece depicted in FIG. 7 also includes a number of connection points that facilitate other attachment mechanisms. For instance, the base unit can have openings or structures that mate with (and secure) the deformable piece. This can include structures that mate with "L" grooves 702, 704 and channel 706. Corresponding structures (e.g., "tabs" and/or "rails") on the base unit can fit within such grooves and channels and thereby secure the deformable piece(s) to the base unit. In particular embodiments, the deformable piece is configured to snap/slide into place. Such features have been discovered to be particularly useful for achieving manufacturing efficiency on a large scale. In comparison, adhesives can be more labor intensive and more prone to quality control challenges. Moreover, features such as those shown in FIG. 7 can be more readily produced by using (fully or partially) automated assembly procedures.

Consistent with certain, non-limiting embodiments, the L-shaped grooves 702, 704 are fabricated in each deformable piece as a 2" long groove. Consistent with certain embodiments, the base unit can include molded plastic rails which are shorter (e.g., 1.5" long). The (0.5") difference in length allows the molded plastic rails of the platform to remain protected by the outside edges of the deformable piece(s) (because of the 0.25" overhang of the deformable pieces beyond each end of the rail). According to various embodiments, a channel 706 can be configured as a rectangular opening that measures around 0.150"×0.062".

Large scale use of MPWH devices by military organizations is facilitated by the use of modular components that can be readily replaced, changed and supplemented. For instance, certain types of foam can deteriorate when exposed to ultraviolet rays from sunlight, and the damaged foam may need to be quickly and securely replaced. The MPWH device can be configured and arranged to allow a soldier to quickly replace part or all of the deformable pieces while in the field, and without tools.

The use of deformable pieces that can snap/slide into place can be particularly useful in this regard. For instance, damaged deformable pieces can be easily removed and replaced without having to scrap the entire MPWH device. Moreover, the deformable pieces can be upgraded or changed to accommodate new weapons or to change the color (e.g., for camouflage purposes specific to a new deployment location).

Certain embodiments are directed toward the use of deformable pieces that are nearly identical. This can be particularly useful for simplifying manufacturing and replacement of the deformable pieces. For instance, a single, spare deformable piece can be kept on hand for use in the event of damage to either one of the current deformable pieces.

Other embodiments recognize that two different types of deformable pieces can be used together. For instance, deformable pieces with different stiffness can be used in combination. This can allow for different levels of support to be provided for the firearm. Moreover, one deformable piece can provide a solid and less pliable platform, while the other deformable piece facilitates insertion and removal of the firearm by being more pliable and/or less firm. As an example, the MPWH device can be placed upon a wall at an angle that causes the weight of the firearm to rest on the solid deformable piece. The solid deformable piece can even be horizontal. The higher stiffness of one of the pieces can help support the weight of the firearm, while the more pliable nature of the other piece facilitates the insertion and removal of the firearm. In certain situations, one of the pieces can be substantially non-deformable (e.g., a rigid plastic or metal material). The other, opposing piece can be sufficiently pliable to still allow a firearm to be inserted and removed.

Consistent with certain embodiments, the deformable pieces can form a replaceable foam sheath made from specially fabricated, flame-retardant, closed cell, polyethylene foam. The foam can be specially formulated for the MPWH to meet or exceed military and UL fire retardant requirements and ratings. These types of ratings often apply to equipment aboard military ships and airplanes.

In certain embodiments, the deformable pieces form a sheath to protect and secure the firearm. The two-piece design of the sheath facilitates the use of different foam configurations for accommodating different weapons with different barrel sizes. The two-piece design can also facilitate various combinations of different fabrications and different densities of foam for the two opposing pieces. The features fabricated into each section of the sheath serve one of two general purposes, attachment or performance.

Although additional variations are contemplated, particular embodiments can be designed with one or more of the following dimensions. When secured, the top 710 of each deformable piece can be flat from the outer corner toward the midline for a distance of about 0.285". At this point, the deformable piece can be angled downward (712) at 22.625 degrees toward the center of the sheath. The flat section/top 710 may provide a useful surface for accommodating the force of a strap that may rest upon the deformable piece while securing a firearm. For instance, by increasing the effective surface area of the interface between a strap and the deformable piece, the force of the strap can be distributed over a larger area.

In certain embodiments, an angled midline 712 can be useful for serving as an entry point for the barrel of the weapon as it is inserted into the cavity 708. A flat section 714 can extend for about 0.297" above the cavity 708. This flat section 714 can be particularly useful for extending the life of the deformable pieces. For instance, a pointed corner at this location could be prone to breakage due to interference with the strapping system or the barrel of a weapon.

The cavity 708 can be sized and configured to house the barrel of the weapon. For instance, the radius of the circle/cavity 708 can be 0.250". When both of the deformable pieces are secured in the MPWH device, the diameter of the circle can be 0.750", which is 0.250" more than the combined radii of the cavities 708. The additional 0.250" is due to the distance between the deformable pieces once they are secured in the MPWH. In certain embodiments, the distance between the deformable pieces is created by a raised portion or ridge that provides the physical separation. This added 0.250" spacing also appears at both the bottom and the top of the cavity 708. The 0.250" space created at the top of the circle 708 allows the barrel to enter the circle. The dimensions of the angles and the radius of the circle are particularly useful for accommodating many US and NATO non-crew served weapons; however, they can also be adjusted to accommodate different barrel sizes.

Figure 8:
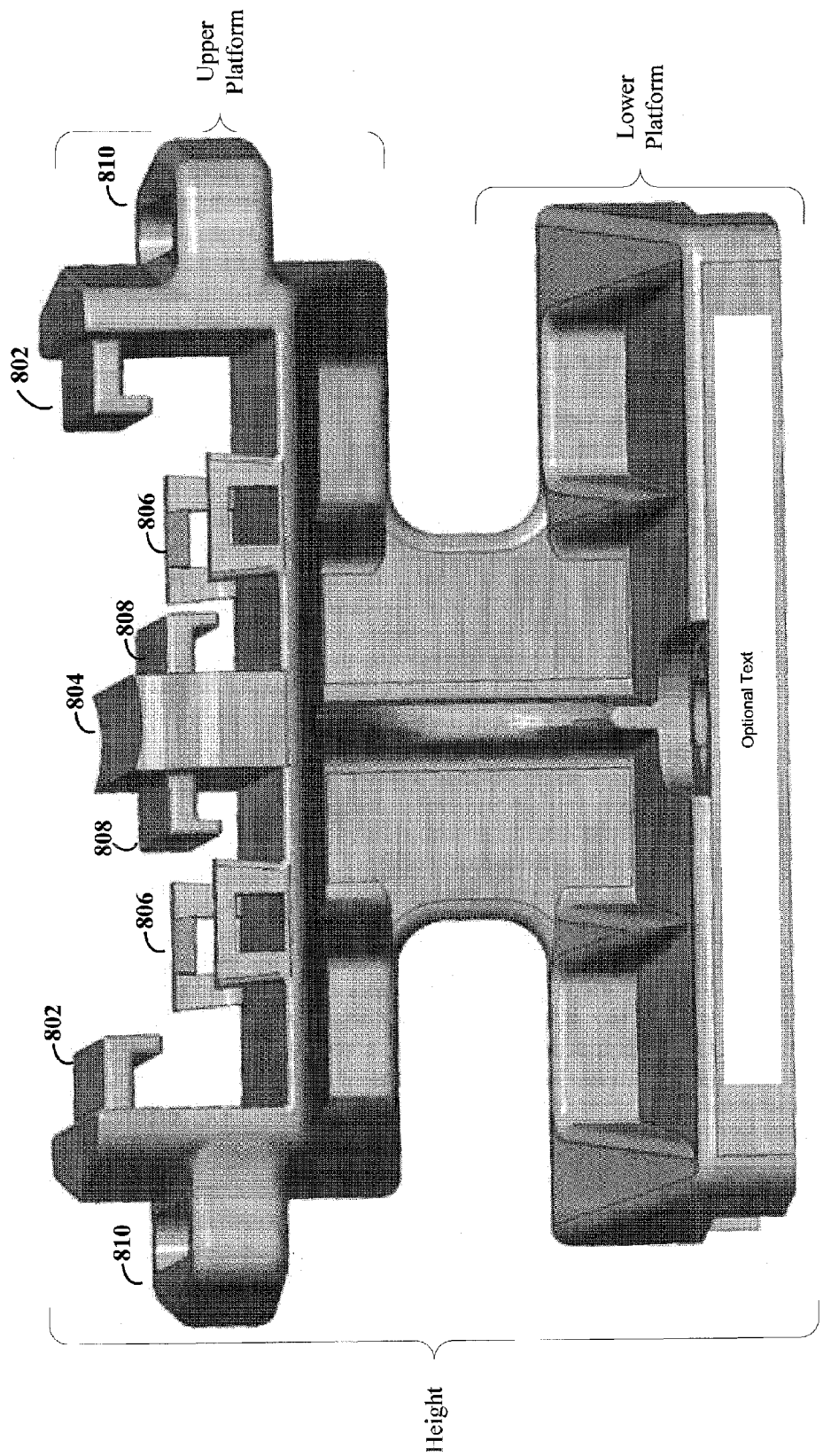
FIG. 8 depicts a front view of a base unit with attachment structures, consistent with embodiments of the present disclosure.

Optional text, such as safety instructions, can be molded into the sides of a platform, as shown in FIGS. 6 and 8. The section of the mold containing the instructions may consist of a removable plate that can be changed to provide different instructions, even different languages (sometimes referred to as a "slug").

FIG. 8 depicts an alternate view of a base unit having multiple attachment structures, consistent with certain embodiments of the present disclosure. The upper platform of the MPWH can include several specialized components, each with its own function. These specialized components can include attachment/securing rails 802, 808, securing tabs 806, the Center Ridge Support (CRS) 804 and handles 810. The barrel of a weapon can be secured to the MPWH when these components are used in conjunction with the deformable piece(s) and/or with a (Velcro) strapping system. For example, attachment rails 802 can be configured and arranged to fit into the L-shaped groove 702 (shown in FIG. 7), while attachment rails 808 can be configured and arranged to fit into the L-shaped groove 704. Similarly, tabs 806 can be configured and arranged to fit within channel 706.

The CRS 804 bisects the upper platform. In certain embodiments, the top of the CRS 804 is concave and is over-molded with a non-skid gripping material, such as 3M Gripping Material. This design conforms to the shape of and allows the barrel of a weapon to nest on top of the CRS 804. The non-skid material (resin) can help to prevent the weapon from sliding forward or backwards. The CRS 804 can also be configured to include securing rails 808, one on each sidewall of the CRS. The securing rails 808 may be part of a comprehensive foam securing system designed to hold in place deformable components (e.g., foam pieces) in the upper platform.

FIG. 8 depicts four different attachment rails 802, 808. Consistent with certain embodiments, the attachment rails 802, 808 are molded, L-shaped rails that run parallel to each other. They can be specially designed to fit into L-shaped grooves/slots 702, 704 in the deformable pieces. In other words, the L-shaped grooves/slots 702, 704 are designed to slide/snap over the attachment rails 802, 802, which then become locked into place. The deformable pieces can still be removed; however, a significant amount of force may be required for such removal.

The L-shape shown in FIG. 8 is but one example of possible shapes and attachment solutions. For instance, the MPWH can be designed to a T-shaped or saw tooth shape for locking attachments. Moreover, the attachments can have different angles for insertion. For instance, the attachment rails 802, 808 can be angled upwards at a 45° angle relative to the sidewalls, and have a saw tooth, T- or L-shape. The deformable pieces can have corresponding grooves or openings. The use of such an angle can both facilitate insertion and allow for additional thickness in the base of the deformable pieces.

As non-limiting examples, each side of the upper platform can include an attachment rail 808 that extends from the sidewall of the CRS 804. The other attachment rail 802 is attached to the inside of the upper platform's end wall. The heights of the attachment rails 808 can be offset to provide additional support to the deformable pieces. For instance, the attachment rails 802 attached to the end walls can be placed higher to secure the outer edges of the sheath within the upper platform. Together, the attachment rails 802, 808 on the CRS 804 can secure the lower midsection of the sheath creating a strong, yet flexible, center connection.

Tabs 806 may have a wedge-like shape that is designed to securely fit into a strategically placed rectangular core or channel 706 in the deformable piece. This combination of attachment elements helps to secure the foam in place to withstand forces from all directions.

Although additional variations are contemplated, particular embodiments can be designed with one or more of the following dimensions. In certain embodiments, the overall (outside dimensions) height can be around 1.8". The height from the bottom platform to where the deformable pieces are situated can be about 1.305". In embodiments where the deformable pieces are about 1.750", the total height of the MPWH can be about 3.055". When measured along the CRS 804, the upper platform can be about 2.250" at the outer dimensions. The outer dimensions of the upper platform when measured handle to handle can be about 3.072" at the outer dimensions. The overall size of the lower platform, measured in the direction of the recessed channel, can be about 2.696". The overall size measured perpendicular to the recessed channel width can be about 2.500". These sizes are provided as examples and are not meant to limit all embodiments.

The CRS 804 can also be designed to provide a 0.25" space between the two deformable pieces. With straight-lined deformable pieces, there will be a 0.25" gap between the two pieces of the sheath at the top. The resulting opening between the deformable pieces allows a soldier to easily push the barrel of the weapon in a downward motion to securely seat the barrel in the circular opening of the deformable pieces. Optional angled portions in the deformable pieces can be included to guide the weapon into the gap. In particular embodiments, when the barrel is secured, the top of the CRS 804 remains about 0.125" below the bottom of the circular opening and the barrel.

Consistent with certain embodiments, an MPWH device can be configured to include slotted handles 810 that extend from the outer edges of each end of the upper platform. The slots can be designed to accommodate a strapping system that can serve a number of purposes, including securing a weapon within the MPWH device. For instance, the slots can be 1.75" wide and 0.150" thick to accommodate a strap of slightly smaller dimensions. The handles 810 can also been designed to withstand forces necessary to disengage the MPWH device when engaged with a surface (e.g., with adhesives, Dual Lock or magnets). A soldier can disengage the MPWH by pulling in an upward motion directly on a handle or the strap.

Various embodiments are directed toward a strapping system, which can use flame-retardant Velcro or another attachment material that meets military specifications. The flame-retardant properties can be particularly useful for use on ships and aircraft. In certain instances, the strap can be 1.5" wide and 10.625" long. A black molded plastic D Ring can be attached (e.g., heat welded) to one end of the strap. The other end of the strap can be rounded to prevent injuries from sharp edges. Extending six inches from the D ring, the strap is fabricated from Velcro-type loop material. Four inches of Velcro hook material can be attached (e.g., heat welded) to the end of the loop material.

To secure a weapon in the foam sheath, the strap can be fed through one of the slotted handles 810, placed over the top of the foam sheath (not shown in FIG. 8), and then down through the other, second slotted handle. When the strap is pulled tight, the D ring can be designed to rest directly against the underside of the handle 810. To secure the strap, the rounded end is pulled tight and placed against the loop material over the sheath. To release the strap, the rounded end is pulled in an upward direction.

In addition to securing a weapon in the MPWH, the strap can be used to disengage the MPWH by pulling the strap in an upward motion when the unit is fastened to a support structure by Dual Lock or magnets. The strap can also be used to fasten the MPWH to a soldier's vest and to stack arms during training. When not in use, the strap can be efficiently folded and stored between the upper and lower platforms of the MPWH.

Figure 9:
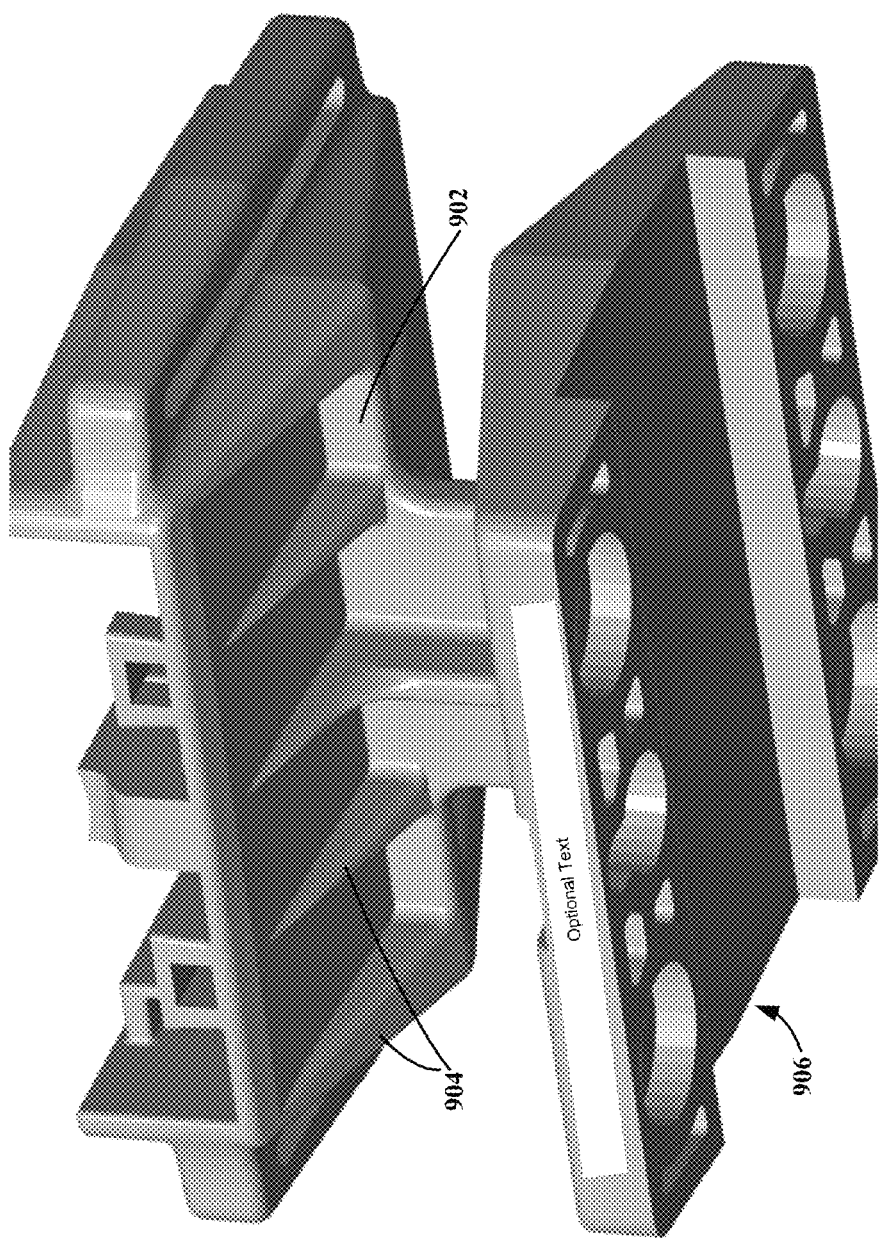
FIG. 9 depicts the underside of the upper platform, consistent with embodiments of the present disclosure.

FIG. 9 depicts the underside of the upper platform, consistent with embodiments of the present disclosure. The underside of the upper platform has a center stabilizing bar 902 that can run the length of the platform between the slotted handles. In certain instances, the stabilizing bar 902 can provide structural support for the upper tray or platform. The stabilizing bar 902 can also include a total of ten buttresses 904 (five on each side) extending in directions perpendicular to the length of the stabilizing bar 902. The buttresses 904 can provide structural support for and strengthen the outer edges of the tray. Recessed channel 906 can include one half of a reclosable fastener system.

Similarly, the upper surface of the lower platform can also have a stabilizing bar running the length of the platform. A total of ten fingers/buttresses connect to the stabilizing bar, five on each side. The buttresses provide support for and strengthen the lower tray or platform. The center buttress on both sides of the stabilizing bar is shortened to allow for the placement of key slot attaching mechanisms in the center of both sides of the platform. The shortened buttresses also serve as a connecting point for one section of the connecting stem.

This design can be particularly useful for an MPWH device that is both lightweight and strong enough to withstand the stresses caused by engagement and disengagement of its attaching mechanisms (e.g., Dual Lock, magnets, etc.).

Figure 10:
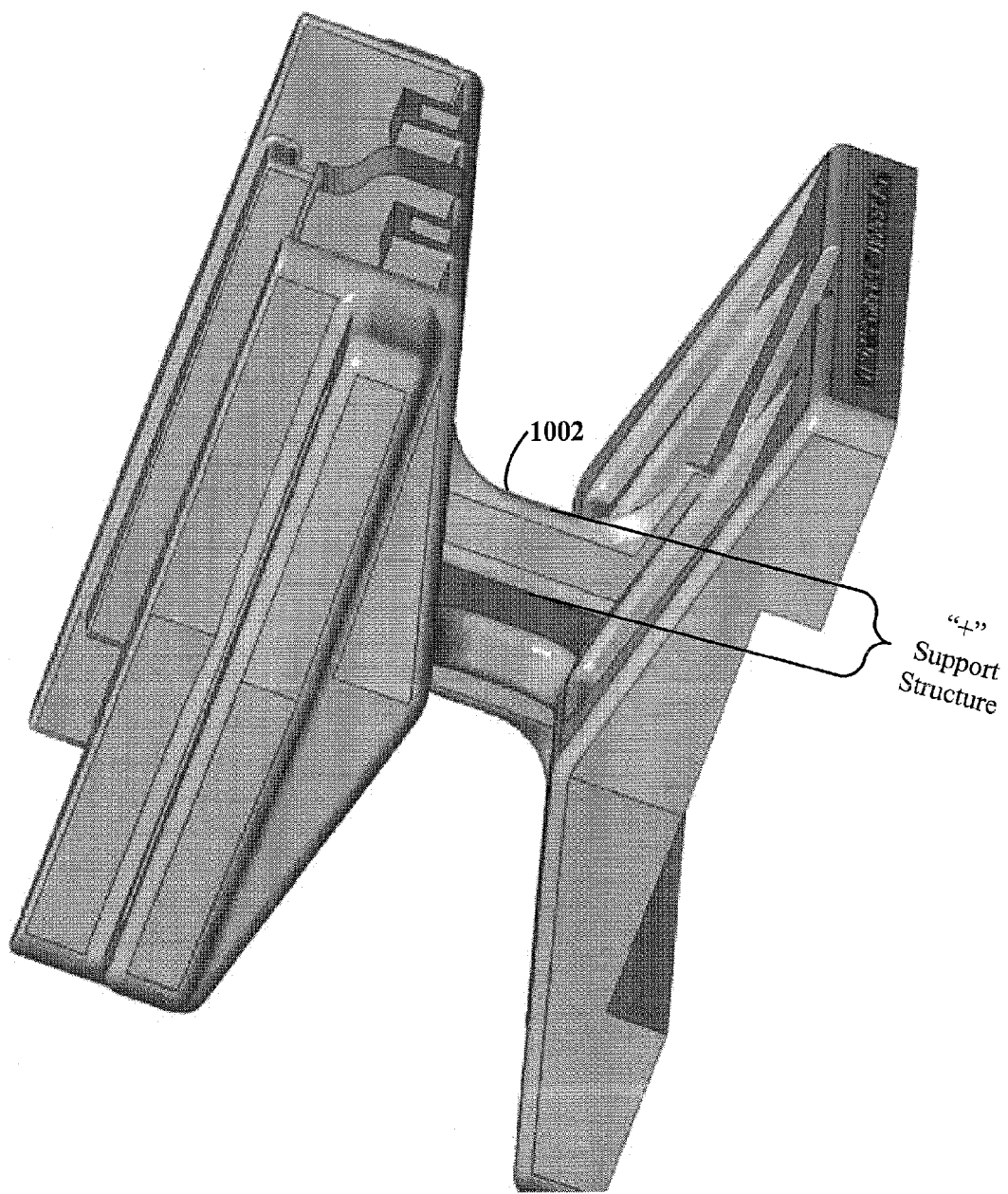
FIG. 10 depicts a view of the support structure between two platforms, consistent with embodiments of the present disclosure.

FIG. 10 depicts a view of the support structure between two platforms, consistent with embodiments of the present disclosure. The support (stem) structure 1002 can be designed to provide additional structural support while still permitting the MPWH device to be lightweight. Accordingly, the support structure 1002 can be designed with support flanges that extend along different directions of the platforms. For instance, the flanges can be configured and arranged in a "+" or "X" shape in which the flanges extend in four different directions. This can provide a significant amount of additional strength, but is less weight than a solid square or rectangular shape of material. One section of the stem can also be connected to the center stabilizing bars of both the upper and lower platforms. The other section of the stem can connect to the center buttress on both sides of the stabilizing bars on both platforms. All four flanges of the connecting stem can be designed to be relatively wide at the point of connection to each platform, allowing pressure to be dispersed from above or below.

Figure 11:
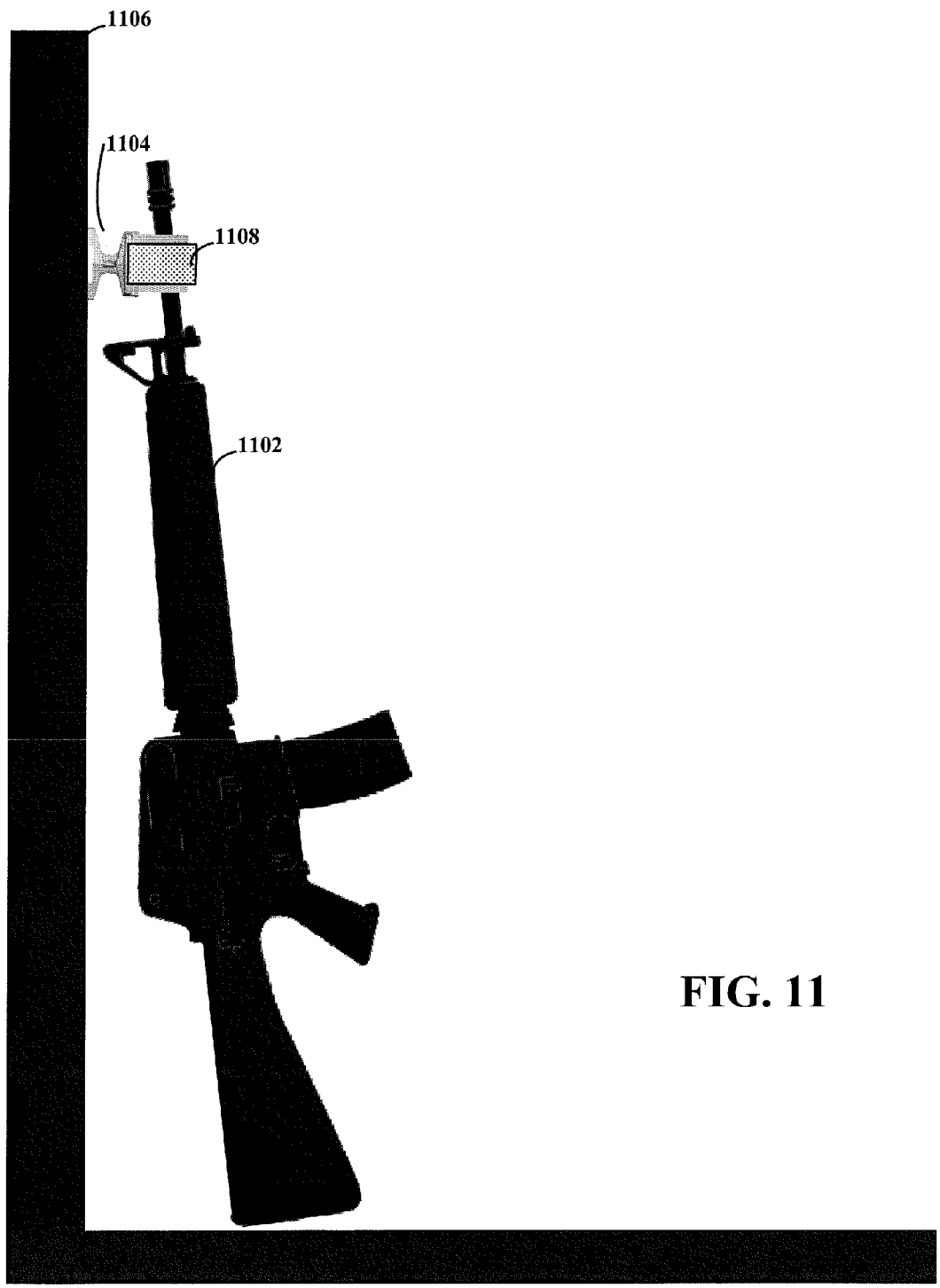
FIG. 11 depicts the use of an MPWH device to secure a firearm against a structure, consistent with embodiments of the present disclosure.

FIG. 11 depicts the use of an MPWH device to secure a firearm against a structure, consistent with embodiments of the present disclosure. Firearm 1102 is shown being secured against a structure 1106. The structure 1106 can be any number of different structures including, but not limited to, a wall of a building. FIG. 11 depicts structure 1106 as being substantially vertical; however, the structure can be at various angles relative to a level surface (such as the floor of a building). For instance, the firearm 1102 can be secured to the floor (0°), wall (90°) or other structures having a variety of different angles.

MPWH 1104 can secure the firearm 1102 by containing the barrel within deformable portions. In certain optional embodiments, a strapping system 1108 can be used to further secure the firearm 1102. MPWH 1104 can be secured, in turn, to the structure 1106 by various different attachment solutions, some of which are discussed in more detail herein.

MPWH 1104 may have a two-platform design that can facilitate placement and removal from the structure 1106. This two-platform design includes, but is not limited to, handles with open gripping space where a thinner support structure or stem connects the two platforms. The stem allows for the application of leverage at the point of the handles in order to apply and disengage the securing mechanisms on the structure 1106.

Figure 12:
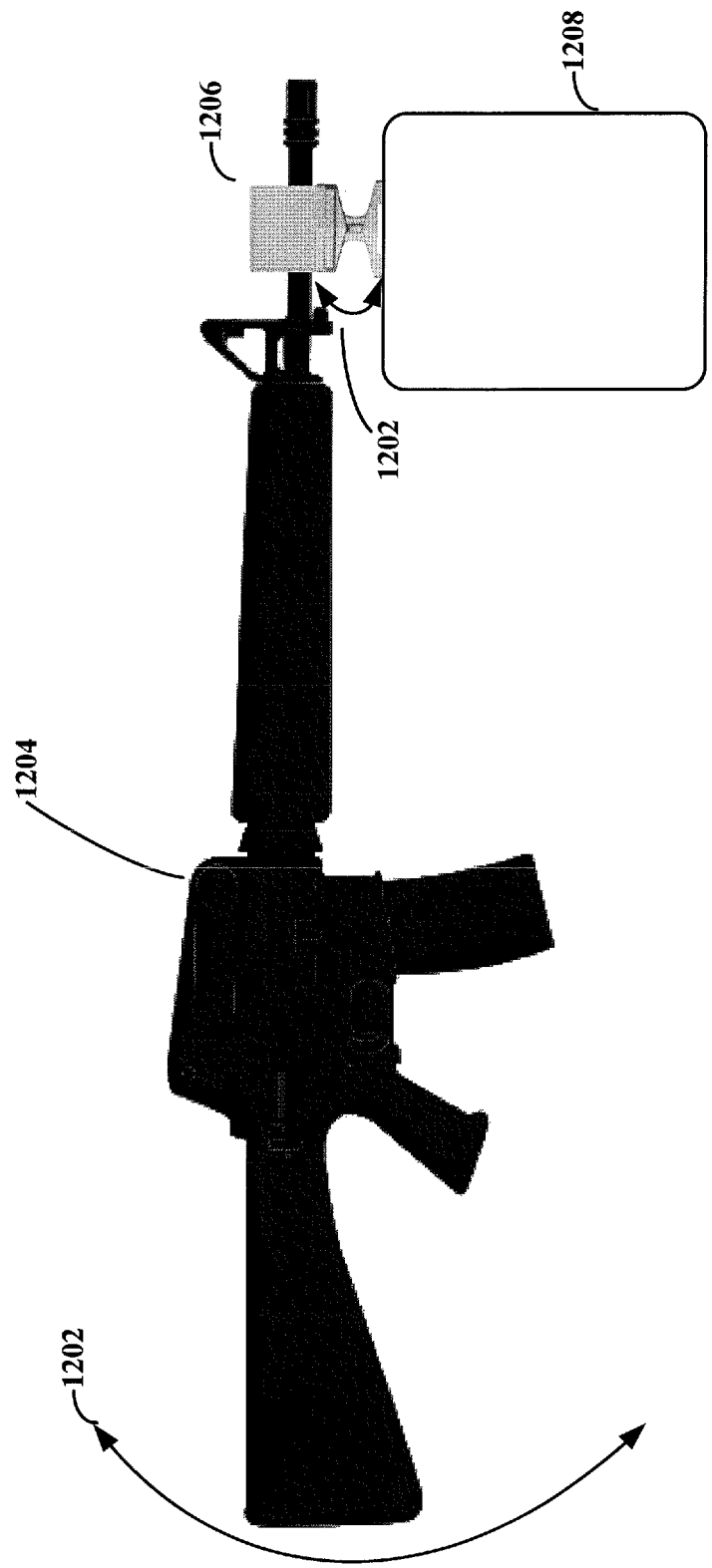
FIG. 12 depicts the use of an MPWH device to stabilize a firearm during aiming or sighting of the firearm, consistent with embodiments of the present disclosure.

FIG. 12 depicts the use of an MPWH device to stabilize a firearm that is being aimed or sighted, consistent with embodiments of the present disclosure. Firearm 1204 is secured within MPWH 1206, which rests upon a structure 1208. When firearm 1204 is discharged, the weapon recoil can result in an impact between the weapon and any structure upon which the barrel rests. If the structure 1208 is hard, this impact can damage the weapon and/or the structure. Thus, it can be undesirable for the structure 1208 to be relatively hard, as may be the case with materials such as metal, wood, rock, glass or other hard or brittle materials. As discussed herein, MPWH 1206 can be configured to cushion the firearm 1204 and thereby permit the structure 1208 to be made of any number of different materials, including relatively hard materials.

Moreover, MPWH 1206 can be designed to facilitate canting of the firearm as indicated by arrows 1202. For instance, when the MPWH has a two-platform design, the height provided by a support structure or stem connecting the two platforms can facilitate the rotation of the MPWH 1206 on the structure 1208. Such canting can also be facilitated by rounding the edges of the bottom platform and/or by providing a raised portion upon which the MPWH 1206 can pivot.

Figure 13B:
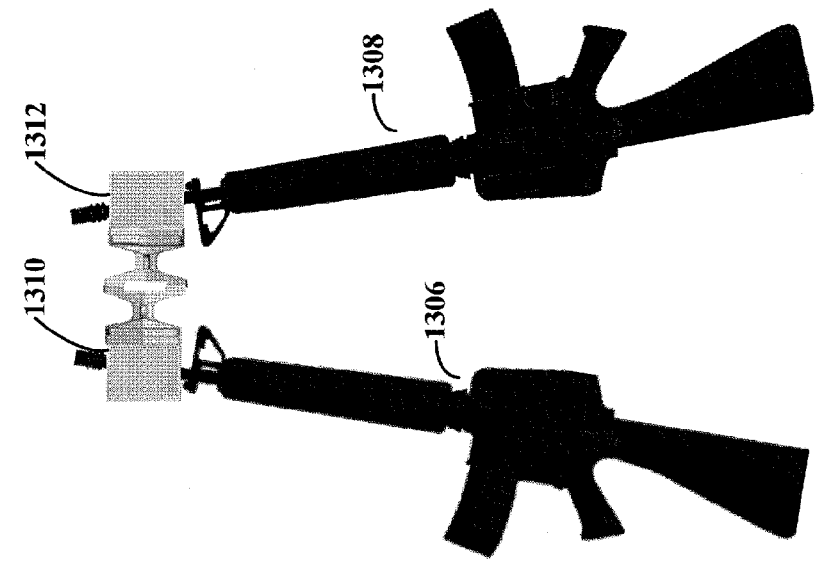
FIG. 13B depicts a use of multiple MPWH's to stack arms, consistent with embodiments of the present disclosure.
Figure 13A:
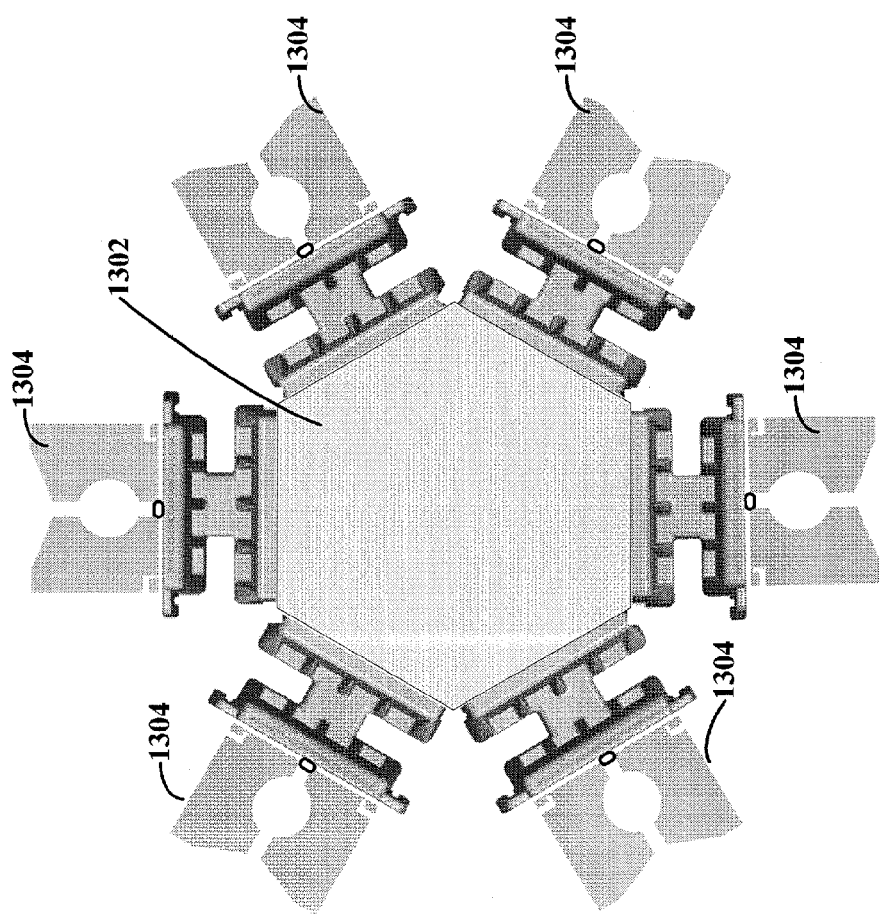
FIG. 13A depicts a component for securing multiple MPWH devices to facilitate stacking of arms, consistent with embodiments of the present disclosure.

FIG. 13A depicts an apparatus for securing multiple MPWH devices to facilitate stacking of arms, consistent with embodiments of the present disclosure. Component or apparatus 1302 provides a number of interfaces upon which MPWH devices 1304 can be attached. For instance, apparatus 1302 can have a flat, central plastic piece surrounded by multiple pegs that fit within key slots on the MPWH devices 1304. (Other attachment solutions are also possible). Two or more MPWH devices 1304 can then be attached to the apparatus so that multiple firearms can be held upright by counterbalancing themselves against one another. In this manner, apparatus 1302 and the MPWH devices 1304 can function as a free standing firearm securing system that can be located virtually anywhere. This can be particularly useful for storing and keeping the firearms off the ground where there are few (or no) suitable support structures for attachment of an MPWH device 1304. The particular hexagonal shape of component 1302 as shown in FIG. 13A is not limiting, and other shapes are possible including, but not limited to, squares, circles, pentagons and octagons.

FIG. 13B depicts a method of stacking multiple arms using multiple MPWH devices, consistent with embodiments of the present disclosure. Firearms 1306 and 1308 can be used to counterbalance one another in a freestanding configuration by securing two MPWH devices to each other. In certain embodiments, the two MPWH devices can be secured to one another using strapping systems (not shown in FIG. 13B).

In other embodiments, the two MPWH devices 1310, 1312 can be provided with magnets, and the two devices 1310, 1312 can be connected by aligning their respective magnets to enable a magnetic attraction. This alignment can be facilitated by manufacturing the MPWH devices 1310, 1312 with specific alignment of north and south magnetic poles. For instance, each MPWH 1310, 1312 can be configured with two magnets in opposite corners and with different north or south poles exposed. In other instances, metallic plugs can be placed in one or more remaining recesses in the bottom platform. The magnetic attraction between the magnets of the opposing MPWH devices 1310, 1312 and the metal plugs can hold the MPWH devices to one another. In certain embodiments, two strips of a reclosable fastener system can be placed back-to-back. The opposing MPWH devices 1310, 1312 can then each be connected to a different side of the back-to-back strips of a reclosable fastener system.

FIG. 14 depicts a MPWH device having a non-planar attachment surface, consistent with embodiments of the present disclosure. The non-planar attachment surface is sized and configured to correspond with the size and shape of a support structure 1402. Embodiments of the present disclosure are directed toward the use of an attachment surface for the lower platform that is specially designed in non-planar configurations for attachment to different surfaces. For instance, it may be desirable to attach an MPWH device to a curved surface (such as a round pole 1402) or to an angled surface (such as the corner of a building). Consistent with certain embodiments, customized MPWH devices may have a lower platform that has the desired shape, whether curved, angled or otherwise. FIG. 14 depicts alternate embodiments where an MPWH device 1408, having a relatively planar lower platform, is modified by adding an attachment surface 1404 that has the desired shape (depicted in FIG. 14 as curved). An interface piece 1406 can connect the attachment surface 1404 to the MPWH device 1408.

Figure 15B:
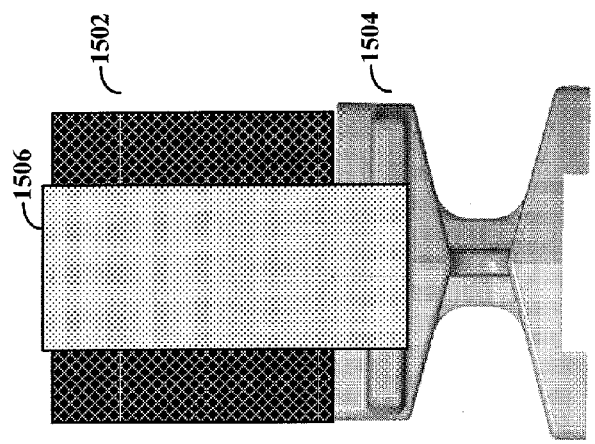
FIGS. 15A and 15B depict a protective cap for placement over the deformable portions when not in use, consistent with embodiments of the present disclosure.
Figure 15A:
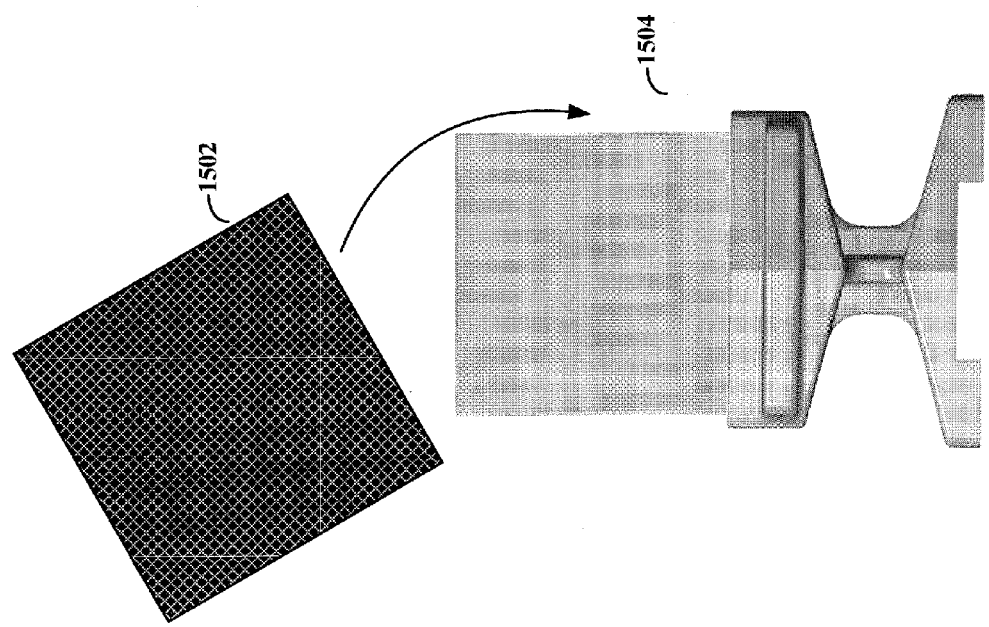

FIGS. 15A and 15B depict a protective cap for placement over the deformable portions when not in use, consistent with embodiments of the present disclosure. The deformable portions of MPWH 1504 can be particularly susceptible to physical damage. For instance, many deformable materials can be broken, chipped or permanently bent. Moreover, certain deformable materials can degrade with exposure to natural elements, such as sunlight or water. Accordingly, a protective cap 1502 can be provided to cover the deformable portion(s) when not in use. In certain embodiments, this protective cap 1502 can be attached using the strapping system 1506; however, other attachment solutions are possible (e.g., a center piece within the cap 1502 that fits within the deformable portion's aperture like the barrel of a firearm).

The following discussion provides further details of one or more experimental embodiments and is not necessarily limited to any particular embodiments discussed herein.

In one embodiment, the MPWH can be molded using a mixture of (virgin) ABS resins and fiberglass (e.g., at a ratio of 80% resin and 20% fiberglass). In one embodiment, the MPWH can be molded using a mixture of nylon and fiberglass (e.g., at a ratio of 70% resin and 30% fiberglass). This can be particularly useful for providing suitable strength. The use of nylon can provide extra flex, which can help accommodate stresses. The exterior surfaces of the MPWH can be heavily textured to achieve a sandpaper-like texture for easy gripping even in wet conditions. The device may also include a stealthy matte finish that will not reflect light. Various components of the MPWH can be designed to function in extreme temperature ranges to assure proper functioning, whether being used in Arctic or desert conditions.

Embodiments of the present disclosure recognize that the MPWH can be used to secure a weapon/firearm on vertical, horizontal and sloped planes or support surfaces. Moreover, the MPWH can be secured to almost any surface. The MPWH allows the user to stabilize a weapon for zeroing in on a target (sighting) in both stationary and moving environments. The MPWH also provides a stable platform for performing weapon cleaning and maintenance. In certain embodiments, the supporting piece or stem between the two platforms can be a moveable joint (e.g., a swivel or ball joint), which allows the weapon to be rotated relative to the device's bottom platform (which could then be secured to a support structure such as a wall or a vehicle hood), whether for aiming or other purposes. Additionally, a locking mechanism can be included to prevent further movement of the weapon once a desired position is achieved or if the MPWH is being used strictly for storage of the firearm.

The MPWH can be designed to be small enough and light enough to be portable for use in the field. When brought to the field, the MPWH can include a Velcro strap that can be used for securing the MPWH to the user's vest. In a vehicle or airplane, the strap can also be used to prevent a weapon from dislodging due to bumps or turbulence. Moreover, the strap can secure additional components such as a removal tool or covering piece, as discussed herein. The MPWH can be semi-permanently attached to almost any surface for side by side use in any type of weapon storage equipment, unit or facility.

Weapons that are stored shipboard must often contend with rolling seas and engine vibration, conditions that may cause weapon damage. Newer ships are being made of lighter metals such as stainless steel and aluminum. Magnets will not work on these metals. When attaching the MPWH to these types of metals, a reclosable (e.g., Dual Lock) fastening system can be employed to attach the MPWH on these metals. In addition, the Velcro strap may help secure weapons and minimize damage in rough weather.

Consistent with embodiments of the present disclosure, the design of the lower platform may have multiple methods of securing the MPWH to a wide range of surfaces. These attachment mechanisms may include a fastener material such as 3M Dual Lock®, key slots, and magnets. A gripping material can also be used to resist sheering pressures. The combination of Dual Lock, magnets, gripping material and key slots allow the MPWH to securely adhere to almost any surface under any condition.

Dual Lock is a reclosable fastening system containing hundreds of mushroom-shaped plastic stems that audibly snap together to form a secure attachment approximately five times stronger than Velcro. Dual Lock has an adhesive backing. Different adhesives are available for different applications. Two opposing pieces of Dual Lock fasten to each other in order to create the bond. Dual Lock comes in varying stem densities, with a higher stem density resulting in a stronger bond. Dual Lock is easier to clean than Velcro. For instance, sand, dirt and mud may render Velcro inoperable, while the Dual Lock material can generally be rinsed clean with water to extend its useful life.

To properly engage (attach together) two pieces of Dual Lock, a rocking motion should be employed, fastening the pieces from one end to the other. The two-platform design of the MPWH's molded base allows the user to quickly and securely grip the MPWH while engaging the Dual Lock with a rocking motion. The pressure required to disengage (separate) two pieces of Dual lock is twice the amount of pressure required to engage the pieces. The use of Dual Lock allows the MPWH to be secured in a stationary manner to any surface, both vertically and horizontally, and in all weather conditions.

The bottom of the lower platform has a horizontal channel which runs completely through it and is visible on either end of the platform. Adhesive-type material (e.g., 3M 250 stem Dual Lock with VHB adhesive: SJ3550CF) can be placed in the channel. The open ends of the channel allow the MPWH to be rapidly secured, and allow the user to visually line up the Dual Lock on the MPWH with the Dual Lock attached to the fastening portion of the support surface. The channel can have a sufficient depth such that the Dual Lock material will not interfere with the function of the other fastening components (such as magnets and key slots), while still allowing for effective interaction of the opposing pieces of Dual Lock.

The use of the SJ3550CF Dual Lock material, a 250 stem version provided as a non-limiting example, can be particularly useful in connection with embodiments where the die cut ends of the Dual Lock are visible at the ends of the platform channel. The use of the CF (clear foam adhesive) allows the Dual Lock material to blend with any resin color, whereas other Dual Lock products have white foam which would be suitable in certain situations, e.g., where camouflage is important. Each MPWH can be provided with additional pieces of SJ3551CF Dual Lock, a 400 stem version provided as a non-limiting example, as well as an isopropyl alcohol wipe for cleaning the support surface to which the Dual Lock is to be adhered.

Embodiments of the present disclosure are directed toward MPWH devices that are configured and arranged to provide bond strength that meets a threshold value. The threshold bond strength can be met by modifying several factors. One factor is the type of reclosable fastening system that is used. For instance, the stem density is a variable for reclosable fastening systems such as Dual Lock. Another factor is the total area available for bonding. This can be controlled by adjusting the amount/area of useable reclosable fastening material that is on the MPWH and/or on the surface to which the MPWH is to be attached. In certain embodiments, different sized strips can be designed for attachment to the surface.

A user of the MPWH can select the appropriate strip size based upon the desired bond strength. For instance, the user may seek greater bond strength when the surface is a ground vehicle that will be traveling over rough terrain and less bond strength when the surface is a stable structure, such as the wall of a building.

Embodiments of the present disclosure are directed toward the use of strips of one-half of a reclosable fastener system that can be conveniently placed on different structures. The MPWH can then be secured to these strips by connecting to the other half of the reclosable fastener system located in channel 906. Certain embodiments recognize that these strips can have varying sizes, which can balance between the desired bond strength and ease of application. For instance, it has been discovered that the use of strips that are smaller than the channel 906 can facilitate alignment.

The bottom of the lower platform can also be configured with cavities designed to include magnets. For instance, circular depressions can be placed near each corner. In a particular experimental embodiment, the cavities can be designed with a specific taper or draft to accommodate neodymium-iron-boron (NdFeB) magnets, which are provided here as an example of one of many well-known magnet types. For instance, circular magnets can be sized and configured to snap into corresponding molded cavities to provide attachment without the use of glue or adhesives; however, adhesives can be used instead of or in addition to the magnet snaps. The number and placement of magnets can vary according to the magnets' size and strength as well as the desired use. For instance, magnets can be placed in each corner for situations where very high levels of magnetism are desired. Aspects of the present disclosure are directed toward a manufacturing process that uses a mold designed to accommodate one or more plugs in the magnet cavities. The use of these plugs allows for the magnet cavities to be selectively implemented. In some embodiments, unused magnetic cavities can also be covered with a (over-molded) gripping material.

Consistent with certain embodiments, the magnets have a protective coating (e.g., a phenolic coating), which can be particularly useful for several reasons. For instance, the phenolic coating can dull the appearance of the magnets by coloring them black, which can reduce the visibility of the MPWH and help with camouflage. Moreover, magnets, such as neodymium-iron-boron magnets, may be susceptible to corrosion/oxidation. The phenolic coating can provide corrosion resistance, as well as providing abrasion resistance and chemical resistance.

The flat surfaces on either side of the platform's center channel can be covered by, over-molded or made from a gripping material (e.g., Santoprene or a 3M Gripping Material/Tile). The gripping material can prevent the MPWH from sliding on both vertical and horizontal planes, even when magnets (or other attachment mechanisms) are also present. Other embodiments allow the use of silicon-based products. Consistent with certain embodiments, the gripping material can be molded directly into the plastic of the platform. For example, the use of a Santoprene resin or a 3M Gripping Tile can provide a thin profile, which is useful for maintaining the effective magnetic strength.

In certain embodiments, one or more key slots can be molded into the outer edges of the bottom of the lower platform. The key slots provide a third method of fastening/securing the MPWH to the support structure. In controlled environments such as armories and offices, screws may be placed to facilitate key slot use. In the field, any protruding nail or screw may be used to hook the key slot to secure the MPWH.

The combination of Dual Lock fastener material, magnets, gripping material and key slots allow the MPWH to securely adhere to almost any surface under any environmental condition.

The top of the lower platform and the bottom of the upper platform can be ergonomically designed to allow the user to quickly and comfortably engage or disengage the unit using either the Dual Lock fastener material, magnets or key slots. The open space between platforms and textured surfaces allows for a firm grip on both platforms even when wet.

The center of the 2"×2" foam sheath can be fabricated to accommodate the barrels of a wide range of weapons and should be large enough to be appropriate for all non-crew served weapons used by the United States military and NATO allies.

The UL rated flame retardant foam can be specially formulated for use in the MPWH in order to meet military specifications. Fire prevention is a paramount concern onboard ships, and various foams can ignite quickly and also release toxic gases. Use of the flame-retardant foam greatly reduces the possibility of the MPWH catching fire.

As previously discussed, the Velcro strapping system secures the barrel of a weapon in the protective foam sheath. This feature prevents the weapon from falling out of the MPWH in a wide range of conditions, whether the weapon is used on an aircraft, on a ship, in the field, or in a weapons storage area.

Camouflage can be an important aspect of military and tactical equipment and operations. The MPWH can be manufactured to meet all current and standard camouflage colors: black, desert sand, forest green and navy grey. The foam component can also be colored to meet any camouflage requirement. The textured surface can be used to diffuse light that strikes the MPWH to reduce visibility of the MPWH (e.g., due to light reflecting off the surface).

The MPWH can be designed to facilitate the safe handling and storage of military and tactical weapons. For example, the MPWH can be designed to secure a rifle in a wide range of conditions. Many of the MPWH features can be specifically designed for use by members of all branches of the Armed Forces. These features can be also useful for other tactical organizations using weapons, e.g., Homeland Security, Border Patrol, state and local police departments, and SWAT teams.

Another component of the system can include a portable Multi-Purpose Butt Plate Holder ("MPBPH") device that can also be used to secure the firearm at a wide variety of locations and/or stabilize the weapon, while still being able to seize a firearm at a moment's notice. This MPBPH device can be used alone; however, it can also be used as part of a system and/or kit. Unless otherwise stated, the various aspects of the MPBPH device can be used in combination with other components of the systems discussed herein.

The MPBPH device can be configured with sidewalls designed to secure the butt of a weapon/firearm. These securing sidewalls can be configured and arranged to allow the butts of different types of firearms to be secured to the device. For instance, the sidewalls can be shaped in a "U" shape with a curved back stop for the butt. In certain embodiments, the sidewalls can be angled to create a cavity that is sized to secure the butts of multiple different types of firearms.

Embodiments of the MPBPH device are designed for use with additional attachment solutions and/or as a standalone item for securing a weapon. The MPBPH device can also be designed for attachment to a wide variety of different structures. A few non-limiting example structures include walls, floors, ceilings, doors, windows, vehicle panels, wheel or track vehicles, boats, planes, helicopters, trees, rocks, boats, airplanes, wheels, sheds, cabinets, boxes, chairs, tables, desks, armored vehicles, wall lockers, fences, utility poles and more. For ease of discussion, the identification of a particular type of structure (e.g., a floor or wall) will be understood to not be limiting unless otherwise stated.

Particular embodiments of the present disclosure are directed toward the contacting portion of the first surface being substantially planar. A planar configuration conforms to numerous surfaces, even surfaces that are themselves not perfectly planar. Other embodiments of the present disclosure are directed toward the first surface having a non-planar interface. For instance, one embodiment can include a curved interface. This can be particularly useful for attachment of the device to poles and similar objects. Another embodiment can be shaped as an L-bracket. This can be particularly useful for placement at the corners of exterior walls or at the top of a wall, among other uses. Other variations are also possible.

The first surface can also be configured to include graspable portion(s) or handle(s) that can be used when applying/securing the device to a structure and also when removing the MPBPH device from the structure. This can be particularly useful for an adhesive-like securing mechanism that uses a rocking motion and pressure to fully engage.

In certain embodiments of the present disclosure, the device includes a leverage point in the form of an opening or protrusion that allows a tool to be inserted between the device and a wall or other structure. In particular, some type of lever can be used to dislodge the device from a wall by inserting the lever to provide mechanical force to separate the wall and the device. For instance, the leverage point can be designed to accommodate readily available equipment, such as a multi-tool or a knife blade. The leverage point can be designed with additional support and/or reinforced to withstand the force used to remove the device from an attached structure. The support can include additional thickness in the first surface around the leverage point and/or plating the leverage point with a sturdy material, such as metal.

Consistent with various embodiments, the device can be ergonomically designed to allow the user to quickly and comfortably engage or disengage the unit using one or more of attachment mechanisms, such as Dual Lock fastening material, magnets or key slots. The handles can include textured surfaces to allow for a firm grip, even when wet.

In certain embodiments, a specially-designed tool can be included with the MPBPH device. In one instance, the tool can be a separate item. For instance, the tool can take the form of a curved bar where the curved portion is designed to act as a fulcrum point (against a wall) when one end of the tool is in contact with the leverage point. This bar can be carried separately from the device. In other embodiments, the device can also include a holding mechanism for storing the tool when it is not in use. The tool can then be removed and used whenever the device is to be removed from a wall or other structure.

In other embodiments, the device can include an integrated tool. For instance, the device can include an integrated extension member that provides additional leverage for removal of the device from a wall or similar structure.

Various experimental devices and related uses are discussed hereafter. These experimental aspects provide support for numerous different embodiments and are not meant to be limiting.

The MPBPH can be made from a variety of materials, including various thermoplastics. Certain embodiments are directed toward the use of a glass filled nylon material and/or a glass filled polypropylene material. In other embodiments, the MPBPH is injection molded using Santoprene, a resin with properties similar to vulcanized rubber. The injection molded MPBPH can be secured to virtually any type of surface using at least one of: magnets, screws, nails or a reclosable fastener system. For instance, screw holes and screws allow the MPBPH to be (relatively) permanently mounted to a surface from any of four different sides (left, right, the rear or the bottom). This can be particularly useful in controlled environments, such as vehicles, ships, planes, armories and offices. These attachment mechanisms can be combined with a gripping material. The gripping material can be configured to resist shearing pressures that are parallel to the attached surface (e.g., to resist downward pressure when the device is attached to a wall).

Figure 16:
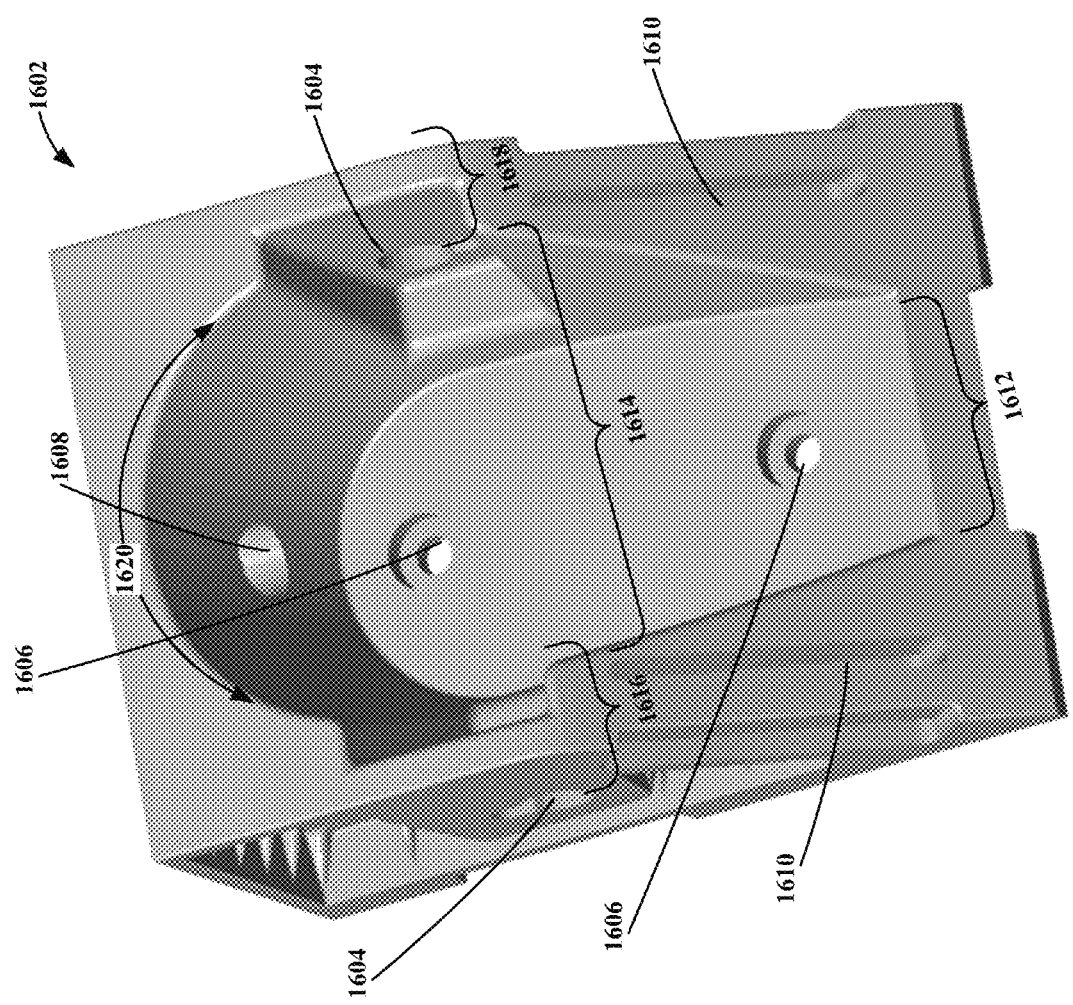
FIG. 16 depicts a unit for an experimental embodiment of a Multi-Purpose Butt Plate Holder ("MPBPH"), consistent with embodiments of the present disclosure.

FIG. 16 depicts a unit for an experimental embodiment of a Multi-Purpose Butt Plate Holder ("MPBPH"), consistent with embodiments of the present disclosure. MPBPH 1602 has sidewalls 1616 and 1618. Together, these sidewalls form an opening, identified by locations 1612, 1614, that is configured and arranged to receive and support the butts of different firearms. Consistent with certain embodiments, the sidewalls can be angled such that the width of the opening is smaller at one location 1612 relative to another location 1614. This "V" like shape helps to guide the weapon butt into the MPBPH. The sidewalls can also be connected by a curved portion 1620. When the MPBPH is in use, the curved portion of the butt can fit against the curved portion 1620. This curved portion 1620 can increase in radius toward the top of the MPBPH, which can also help to guide the weapon butt into the MPBPH. The use of the term "butt plate" does not necessarily exclude the stock, buttstock or shoulder stock. For instance, the butt plate can be inserted into the MPBPH device and secured therein. At the same time, the buttstock or shoulder stock can also be secured.

The MPBPH can be configured and arranged to facilitate the insertion and removal of a firearm butt plate from multiple directions and as might be relevant for different orientations of the firearm. For instance, when the firearm is to be secured in a vertical direction (relative to gravity), it can be convenient to insert and remove the firearm in the vertical direction. The V-like shape can be particularly useful for such uses by guiding the firearm butt plate down toward the base of the MPBPH. The MPBPH can also include a horizontal opening at locations 1612, 1614. This opening can facilitate insertion and removal of a firearm butt plate in the horizontal direction, which can be particularly useful for when the firearm is to be secured in a horizontal orientation. For instance, the firearm can be lowered into the MPBPH until it contacts and rests upon the curved portion 1620.

Consistent with particular embodiments, the MPBPH is approximately 3" by 4" in size and can accommodate weapons with butt widths up to 1.625" and 6" long. This will accommodate many (or even most all) non-crew served weapons used by the United States Armed Forces. A slightly larger version of the MPBPH accommodating butt widths up to 2.5" would secure the larger, non-crew served weapons, which may not fit in the 1.625" version.

This is facilitated by making the opening for the weapon stock in the form of a V. The butt of the weapon is also slid to the rear of the holder. The butt stock of the weapon can then be secured to the base by using a (Velcro) strapping system.

The MPBPH also includes graspable portions/handles 1610, which can include slots for attaching a securing component such as a flexible strap. This flexible strap can be configured and arranged to secure the butt of the firearm.

Various embodiments are directed toward a strapping system, which can use military spec/flame retardant Velcro, or other material that meets military specifications. The flame retardant properties can be particularly useful for use on ships and aircraft. In certain instances, the strap can be 1.5" wide and 16" long, although the strap can be longer or shorter if desired. A (black) molded plastic D Ring can be attached (e.g., heat welded) to one end of the strap. The other end can be rounded to prevent injuries from sharp edges. Extending twelve inches from the D ring, the strap is fabricated from an Velcro-type loop material. Four inches of Velcro hook material can be attached (e.g., heat welded) to the end of the loop material.

To use the strap, a rounded end is inserted up through the slot on either handle 1610 of the MPBPH. The strap is pulled over the butt stock of the weapon, fed down through the other handle, pulled tight and the rounded or hooked end is placed on the loop material and secured. Special cavities have been designed to accommodate the D ring on the sides of the MPBPH next to the handles. When the strap is pulled tight, the D ring is pulled into and can nest flush in one of the cavities. This protects the D ring and allows two MPBPH units to be put side by side without obstruction by the D ring. When not in use, the strap can be fed through the handles and secured to itself.

Consistent with embodiments of the present disclosure, the MPBPH can include one or more openings (or holes) that allow a screw or nail to be used for attaching the MPBPH to different surfaces. For instance, screw/nail holes at locations 1606 allow the MPBPH to be screwed/nailed to a surface that is substantially perpendicular to the orientation of a secured firearm. For instance, if the firearm is secured vertically relative to the ground, the MPBPH can be nailed to the floor or to a similar horizontal surface, such as a table top. Screw/nail hole 1608 allows the MPBPH to be attached to a surface that is substantially parallel to the orientation of a secured firearm. For instance, if the firearm is secured vertically, the MPBPH can be nailed to a wall or to a similar vertical surface. Key slots 1604 allow the MPBPH to be attached to a surface that is substantially parallel to the orientation of a secured firearm; however, the MPBPH and the secured firearm can be rotated ninety degrees relative to when the hole at location 1608 is used. The particular configuration of key slots and screw/nail holes can be modified as desired. For instance, key slots can be used in place of screw/nail holes in either of locations 1606 or 1608 and vice versa. Consistent with embodiments of the present disclosure, the screw holes at locations 1606, 1608 can be countersunk so that the head of a nail or screw does not contact or damage a firearm that is secured in the MPBPH.

Figure 17:
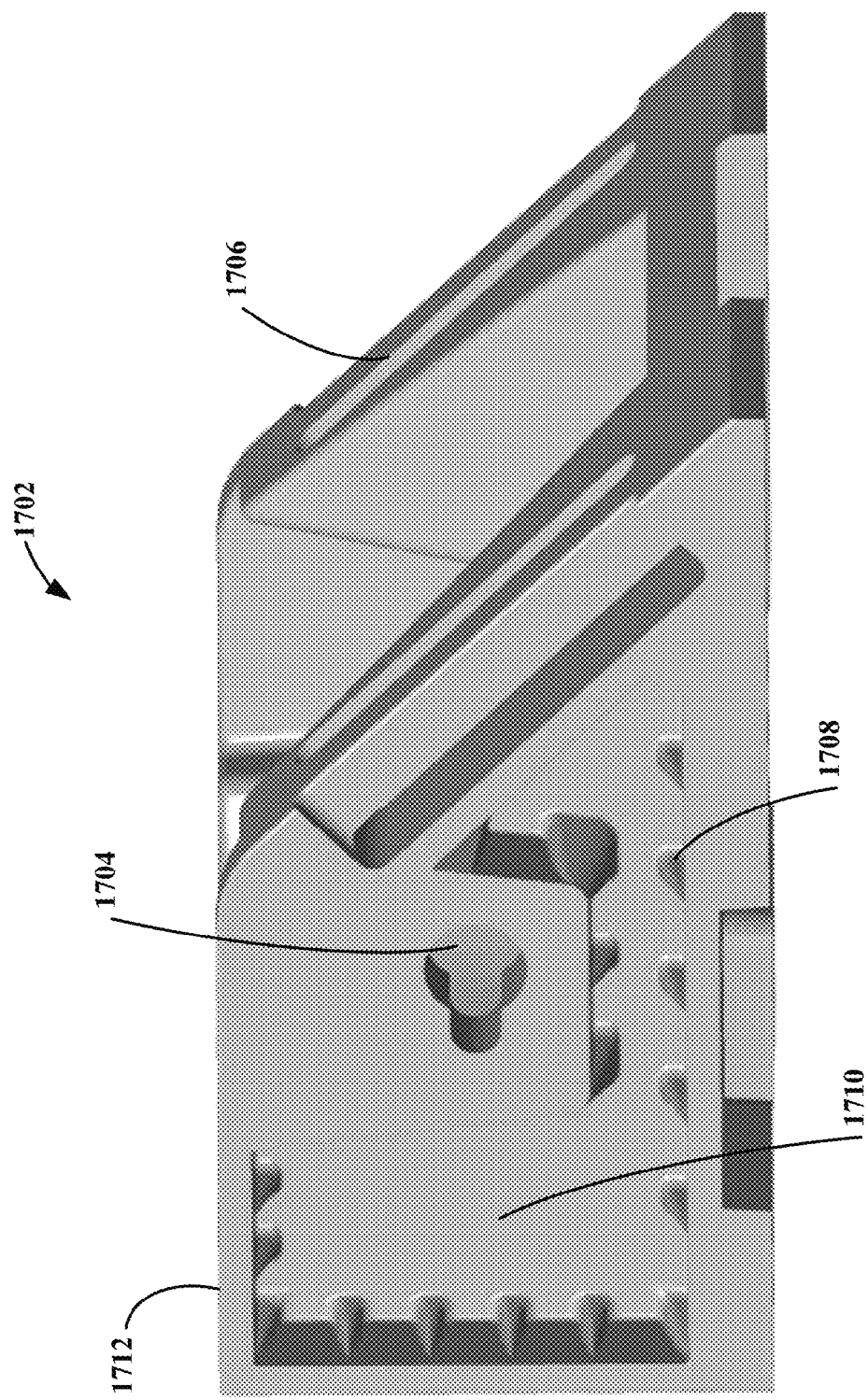
FIG. 17 depicts a side view of an experimental embodiment of an MPBPH, consistent with embodiments of the present disclosure.

FIG. 17 depicts a side view of an experimental embodiment of a MPBPH, consistent with embodiments of the present disclosure. MPBPH 1702 includes both key slot 1704 and slots 1706, as discussed in connection with FIG. 16. Moreover, the sidewall 1712 is configured with a recessed portion 1710 and support fingers/buttresses 1708, which extend from within the recessed portion. The recessed portion 1710 can be useful for reducing the weight of the MPBPH and/or for providing a graspable location. For instance, a person using the MPBPH can more easily grasp the device so that it can be secured onto or removed from a suitable support structure. This is particularly useful when using a reclosable fastener system that requires pressure in order to apply or remove the MPBPH from a support structure. The buttresses 1708 can be configured and arranged to provide additional strength to the sidewalls.

Figure 18:
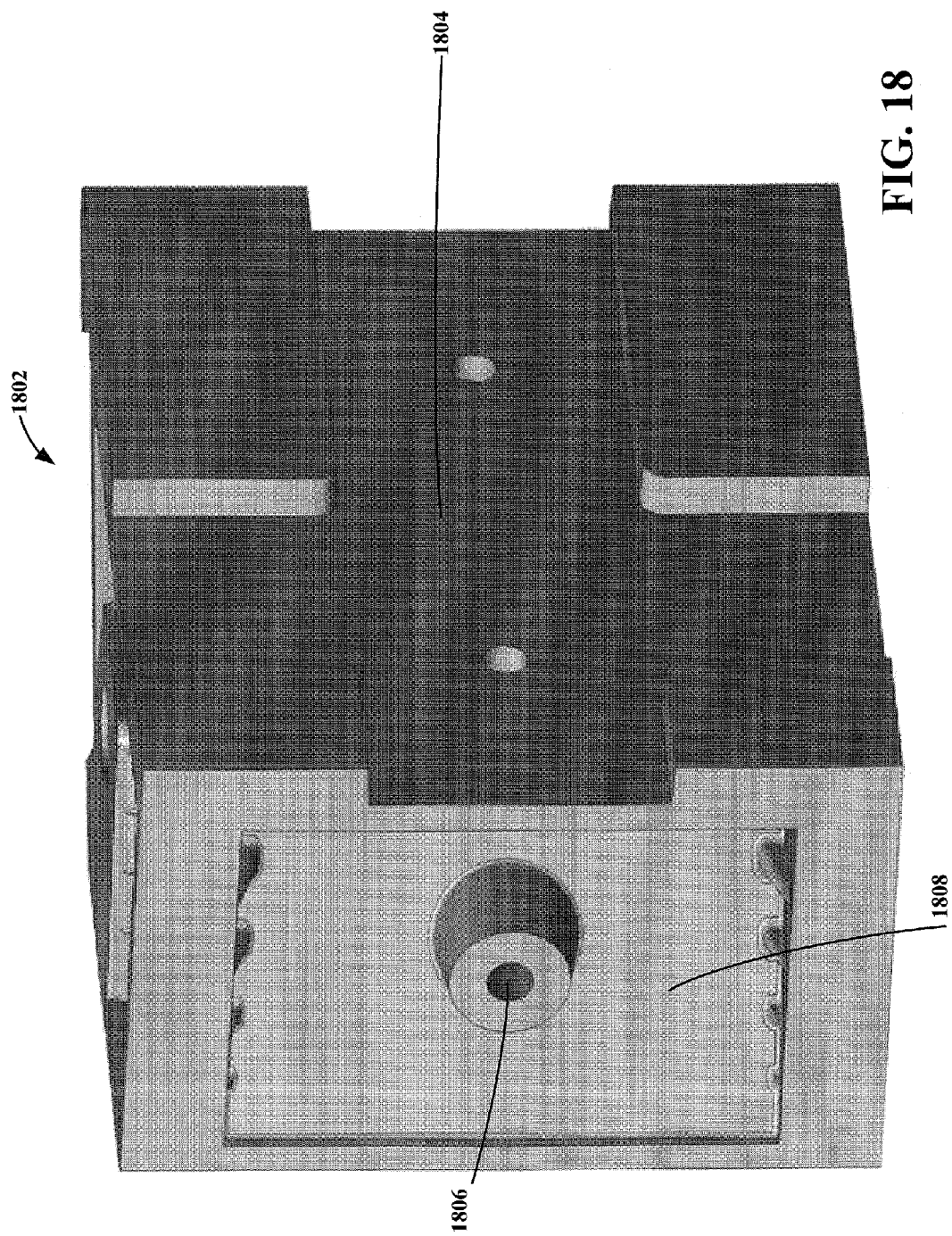
FIG. 18 depicts a view of the bottom and back of an experimental embodiment of an MPBPH, consistent with embodiments of the present disclosure.

FIG. 18 depicts a view of the bottom and back of an experimental embodiment of a MPBPH, consistent with embodiments of the present disclosure. The rear wall of the MPBPH 1802 can include a recessed portion 1808. This recessed portion can be useful for reducing the weight of the MPBPH 1802 and/or for providing a graspable location. As shown in FIG. 18, the recessed portion is deeper toward the bottom the MPBPH 1802 because it follows the change in size/radius for the curved portion of the rear wall. In certain embodiments, support buttresses can be included to provide additional strength.

As shown in FIG. 18, the screw/nail hole can include an extension piece 1806 that is configured and arranged to be flush with the external surface of the rear wall of the MPBPH 1802. This extension piece 1806 can thereby provide additional stability when the MPBPH 1802 is attached to a planar surface, such as a wall.

FIG. 18 also depicts a channel 1804 in the bottom of the MPBPH 1802, formed by a "+" shaped recess. This channel can be filled with one half of a reclosable fastening system, such as 3M Dual Lock®, which contains hundreds of mushroom-shaped plastic stems that audibly snap together to form a secure attachment approximately five times stronger than Velcro. Two opposing pieces of a reclosable fastening system fasten to each other in order to create the bond. In this manner, one half of the reclosable fastening system can be located within the channel 1804, and the other half can be placed upon a support structure, such as a wall or the floor. When a strip of a reclosable fastening system is placed on a support structure, the + shape for the channel 1804 allows for the MPBPH be turned 90 degrees and still be attached to the applied strip. This can be particularly useful when a firearm has large protrusions, such as a large optical sighting scope.

Aspects of the present disclosure are directed to features of the other half of the reclosable fastening system, which allows the device to be secured to a variety of different surfaces. For instance, the other half of the reclosable fastening system (e.g., the Dual Lock material) can be located on a first side of a double-sided strip. The other side of the strip can have an adhesive that allows the strip to be attached to a wall, floor or other structure. The second side can include the other half of the reclosable fastening system that bonds to the MPBPH in a reusable manner.

In particular embodiments, adhesive material (e.g., 3M 250 stem Dual Lock with VHB adhesive: SJ3550CF) can be placed in the channel 1804. The four open ends of the + shaped channel 1804 allow the user to visually line up the two halves of the reclosable fastening system (e.g., to line up Dual Lock on the MPBPH and Dual Lock attached to the fastening surface).

Consistent with embodiments of the present disclosure, the channels can be designed to have a sufficient depth such that the reclosable fastening material (e.g., Dual Lock material) will not interfere with the functions of other fastening components (such as magnets and screw holes), but the material will still be able to interact with the opposing half of the reclosable fastening system. Placing one half of the reclosable fastening system within the channel 1804 can also be useful for allowing the use of screw holes without damaging the reclosable fastening system.

In certain embodiments of the present disclosure, the remaining raised sections can be covered with a gripping material (e.g., Santoprene or a 3M Gripping Material/Tile). This gripping material can be over-molded directly into the bottom of the MPBPH 1802. In particular embodiments, the over-molding can cover all areas other than the locations of magnets, such as two magnets (not shown in FIG. 18) in opposite corners of the lower platform.

Embodiments of the present disclosure are directed toward camouflage and/or concerns over the visibility of the MPBPH 1802 to an enemy combatant. A clear reclosable fastening system can blend with any resin color of the MPBPH 1802. A non-limiting example is 3M SJ3550CF Dual Lock, which has die cut ends that are visible for helping to align the platform channels. A clear foam adhesive allows the SJ3550CF to blend with different resin color.

Embodiments of the present disclosure are directed toward the use of additional pieces of reclosable fastening material, as well as providing an isopropyl alcohol wipe to clean a surface to which the reclosable fastening system is to be adhered.

Reclosable fastening systems are available in varying bond strengths (e.g., Dual Lock has different stem densities, with a higher stem density resulting in a stronger bond). The particular bond strength can be selected according to the particular application. Embodiments of the present disclosure are directed toward MPBPH devices that are configured and arranged to provide bond strength that meets a threshold value. The threshold bond strength can be met by modifying several factors. One factor is the type of reclosable fastening system that is used. For instance, the stem density is a variable for reclosable fastening systems such as Dual Lock. Another factor is the total area available for bonding. This can be controlled by adjusting the amount/area of useable reclosable fastening material that is on the MPBPH and/or on the surface to which the MPBPH is to be attached. In certain embodiments, different sized strips can be designed for attachment to the surface. A user of the MPBPH can select the appropriate strip size based upon the desired bond strength. For instance, the user may seek greater bond strength when the surface is a ground vehicle that will be traveling over rough terrain and less bond strength when the surface is a stable structure, such as the wall of a building.

To properly engage (attach together) two pieces of Dual Lock, a rocking motion should be employed, fastening the pieces from one end to the other. The force required to disengage or separate two pieces of Dual Lock is twice the amount of force required to engage the pieces. The use of Dual lock allows the MPBPH to be secured in a stationary manner to any surface, both vertically and horizontally (even upside down) and in all weather conditions.

Although not shown, the bottom of the MPBPH can also include one or more magnets. These magnets can be located within cavities, or recesses, designed to house the magnets. For instance, circular depressions can be placed in each corner, sized and configured to accommodate corresponding magnets (e.g., neodymium-iron-boron (NdFeB) magnets). The circular magnets can snap into the molded depressions without the use of glue or adhesives; however adhesives can be used instead (or in addition). Experimental testing suggests that fewer than four magnets can provide sufficient holding power; however, the use of four magnets may be particularly useful in situations where very high levels of magnetism are required.

Consistent with certain embodiments, the magnets have a phenolic coating. This coating can be particularly useful for several reasons. For instance, the phenolic coating can dull the magnets by coloring them black, which can reduce the visibility of the MPBPH and help with camouflage. Moreover, magnets, such as NdFeB magnets, can be subject to corrosion. The phenolic coating can provide corrosion resistance, abrasion resistance and chemical resistance.

Other embodiments of the present disclosure recognize that it may not be desirable to have multiple attachment mechanisms being used concurrently. For instance, if the MPBPH device is placed on a ferromagnetic wall, the combination of the magnet, gripping material and adhesive may require a detachment force that exceeds the desired range (e.g., relative to human hand strength). Accordingly, embodiments of the present disclosure are directed toward temporarily disabling one or more attachment mechanisms. As a non-limiting example, a thin (plastic) covering piece can be provided to cover the adhesive portion of the MPBPH device. The covering piece can thereby prevent the adhesive from sticking to a wall or similar structure, while still allowing the magnets to be used as the primary attachment mechanism. The covering piece can also protect the adhesive portion from exposure to dirt or other contaminants which might be on the wall. In one instance, this covering piece can be held in place by the adhesive portion itself; in other instances, the covering piece can snap or slide into place. Moreover, the covering piece can be used to protect the adhesive portion from damage or wear while the MPBPH is not in use.

Figure 19:
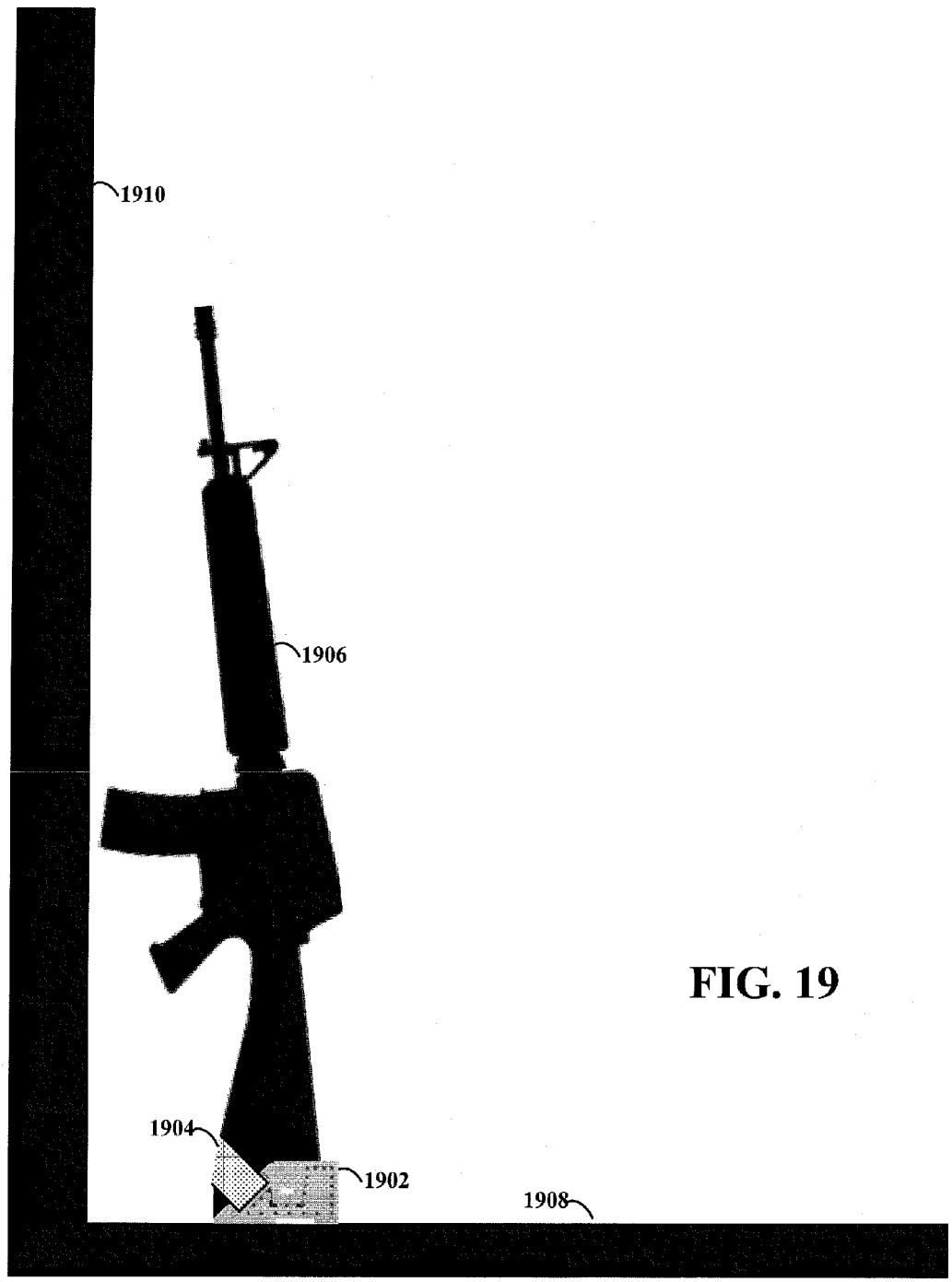
FIG. 19 depicts an MPBPH used to secure a firearm in a substantially vertical fashion, consistent with embodiments of the present disclosure.

FIG. 19 depicts a MPBPH used to secure a firearm in a substantially vertical fashion, consistent with embodiments of the present disclosure. Firearm 1906 is shown as being secured by MPBPH 1902. MPBPH 1902 is secured to the horizontal surface 1908 (e.g., the floor of a building, vessel or aircraft). For instance, MPBPH 1902 can be fastened to surface 1908 using one or more of a reclosable fastening system, screws, nails or magnets.

The butt of the firearm 1906 is placed within the MPBPH 1902 such that the sidewalls help to secure the firearm 1906. In this manner, the firearm 1906 is prevented from falling side to side by the sidewalls. Strap 1904 can then be used to further secure firearm 1906. Firearm 1906 can also be stabilized by being in contact with the vertical surface 1910 (e.g., a wall of a building, vessel or aircraft). Thus, MPBPH 1902 can be located sufficiently close to accommodate this contact with the vertical surface 1910. Moreover, a MPWH device (not shown) can also be used in conjunction with the MPBPH 1902.

Consistent with certain embodiments, additional support devices or elements can be used in conjunction with MPBPH 1902. For instance, a support device can be placed on vertical surface 1910 to secure the barrel of the firearm 1906.

When the firearm 1906 is removed from the storage location, the MPBPH 1902 can also be removed so that it can later be used in another location. For instance, a solider may place a first strip of a reclosable fastener on the floor in a first location of a naval vessel. The MPBPH 1902 can then be secured to the strip of a reclosable fastener and the firearm 1906 can be secured. When the solider leaves this area, the firearm 1906 can be removed along with the MPBPH 1902. The solider may subsequently place a second strip of a reclosable fastener on the floor in a second location of a naval vessel, and use the MPBPH 1902 at this second location. Soldiers can then continue to reuse these strips whenever they are in either of these locations.

Figure 20:
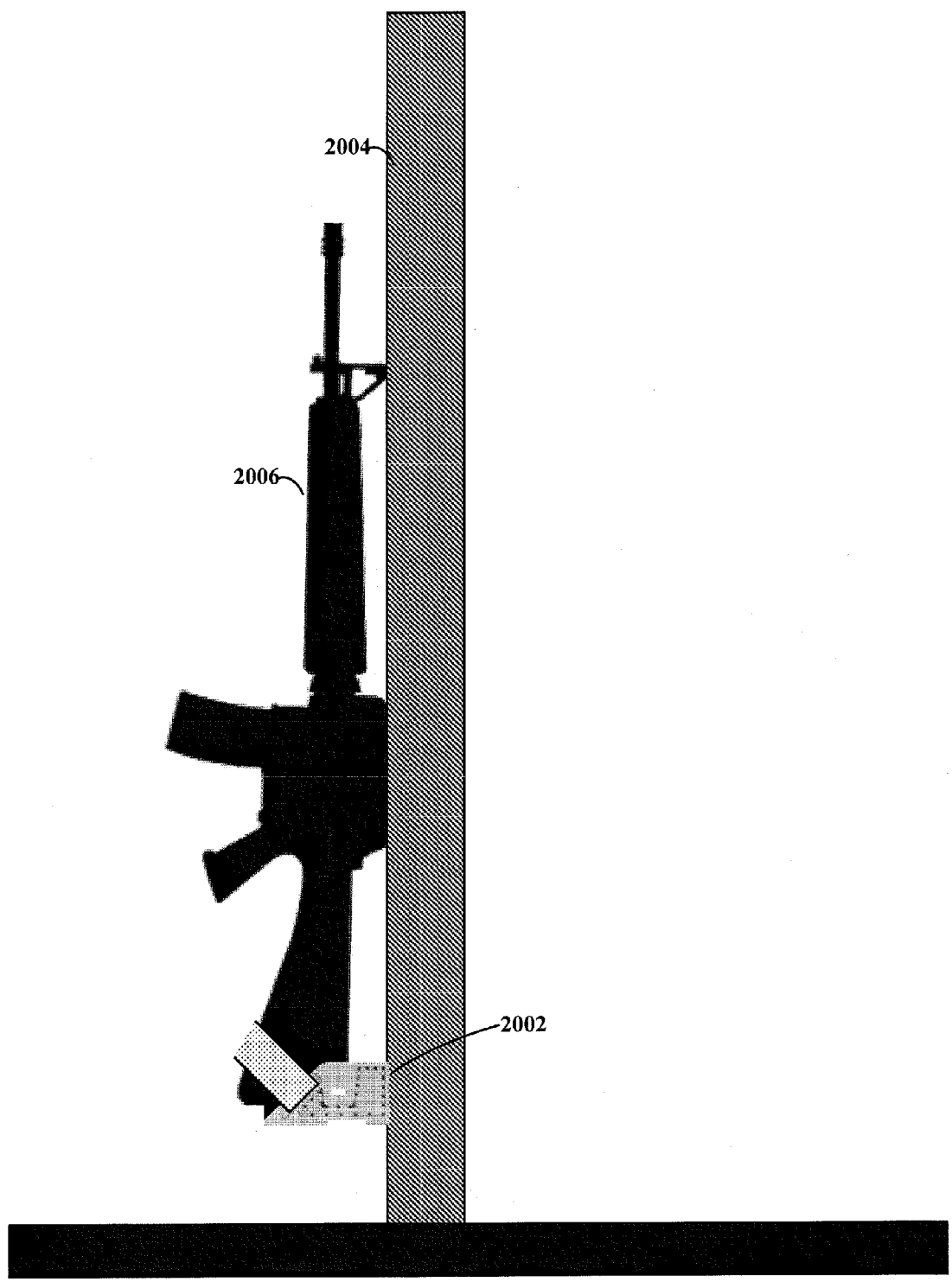
FIG. 20 depicts an MPBPH used to secure a firearm in a substantially vertical fashion while raised off of the ground, consistent with embodiments of the present disclosure.

FIG. 20 depicts a MPBPH used to secure a firearm in a substantially vertical fashion while raised off of the ground, consistent with embodiments of the present disclosure. FIG. 20 shows some of the versatility of the MPBPH 2002. Here, the MPBPH 2002 has been fixed to vertical surface 2004. This allows for the firearm 2006 to be secured off of the ground, which may protect the firearm from water and/or place the firearm at a more convenient height for retrieval. Moreover, a MPWH device (not shown) can also be used in conjunction with the MPBPH 2002.

Figure 21:
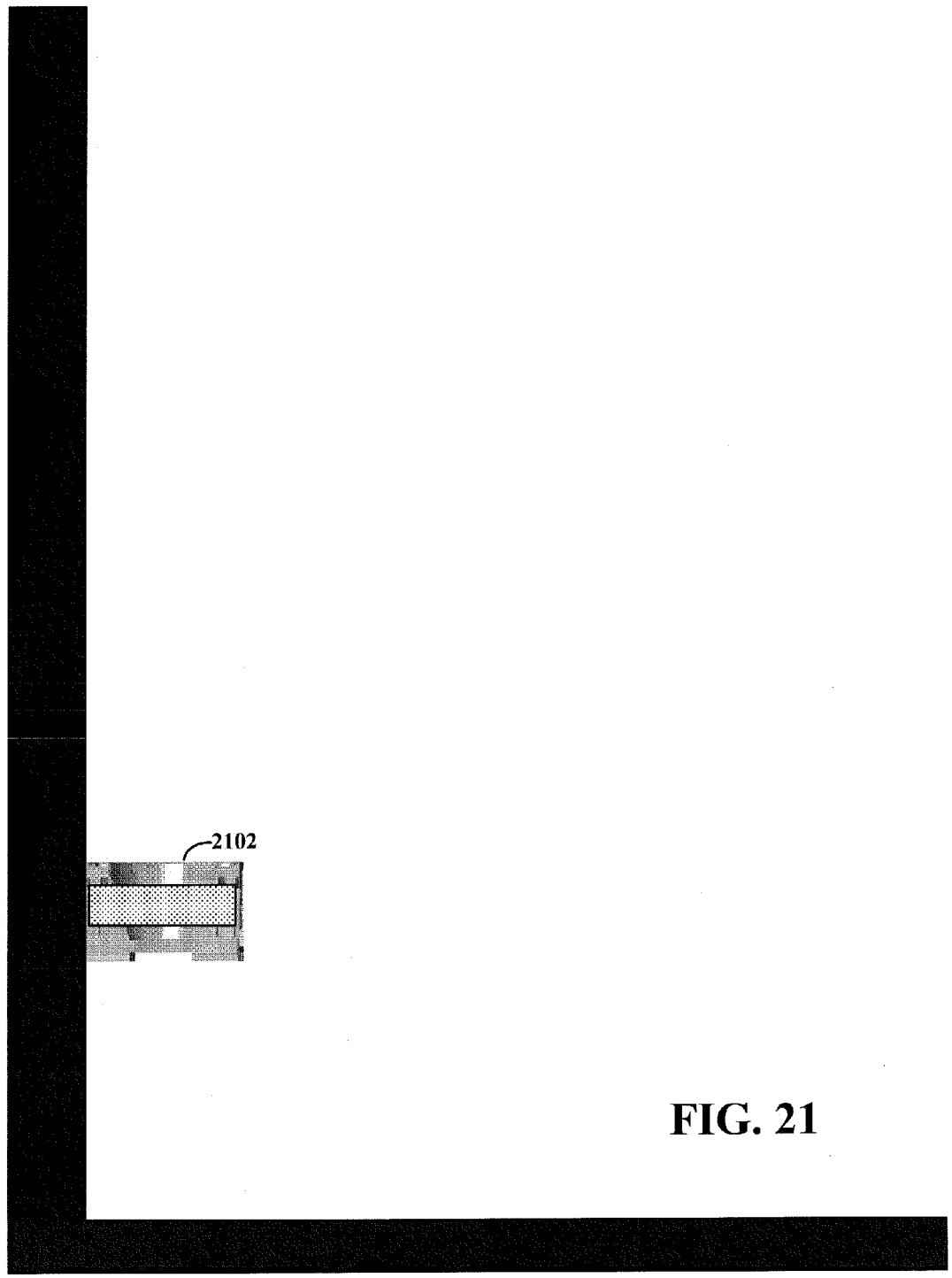
FIG. 21 depicts an MPBPH used to secure a firearm in a substantially vertical fashion while raised off of the ground and rotated, consistent with embodiments of the present disclosure.

FIG. 21 depicts a MPBPH used to secure a firearm in a substantially vertical fashion while raised off of the ground and rotated, consistent with embodiments of the present disclosure. The MPBPH 2102 is attached off of the ground, as shown in FIG. 20; however, the MPBPH 2102 has been rotated ninety degrees. This can be particularly useful for accommodating different sized and shaped firearms, which might otherwise not fit against the attached wall. A MPWH device (not shown) can also be used.

Figure 22:
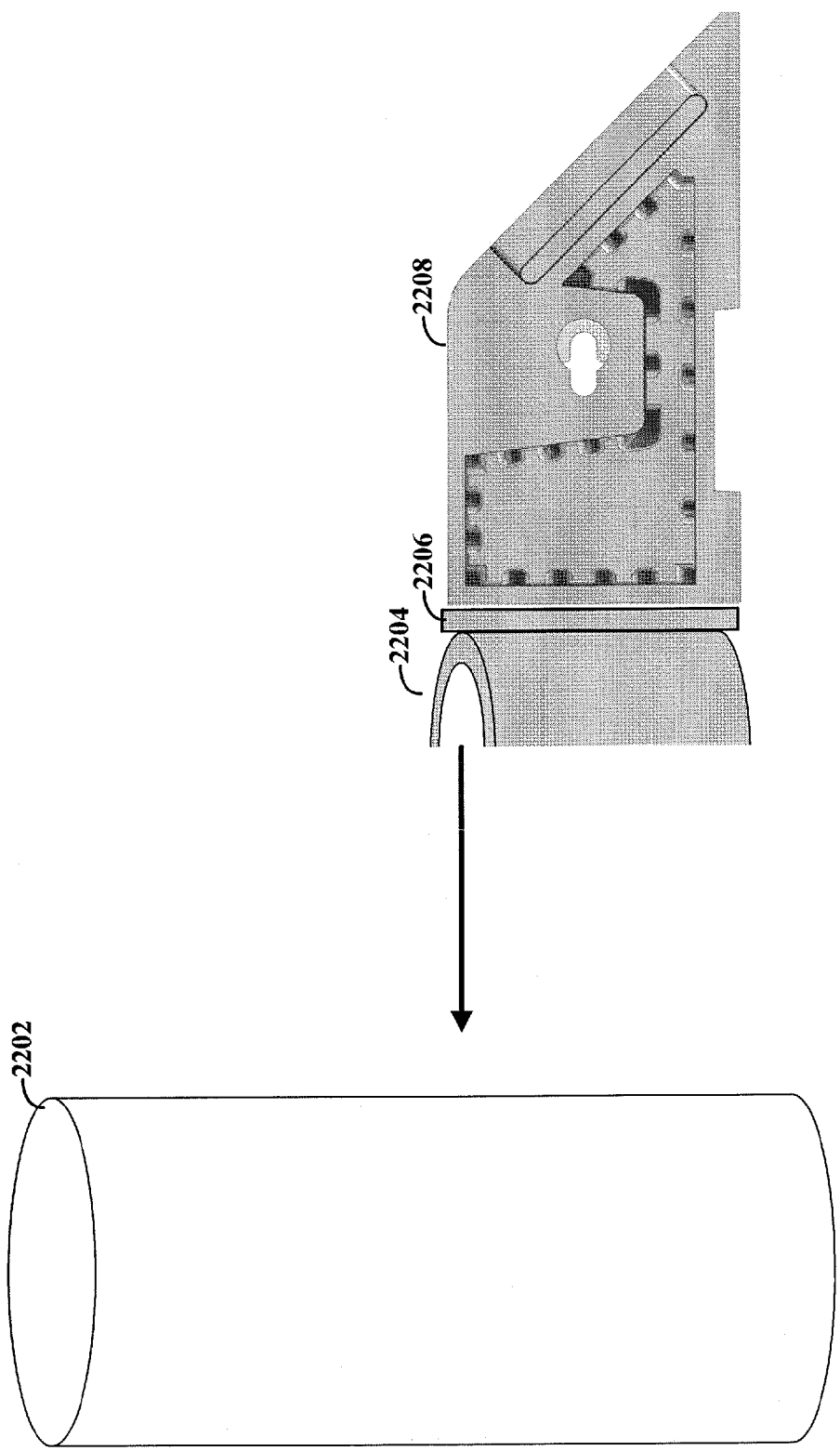
FIG. 22 depicts an MPBPH with a non-planar attachment surface, consistent with embodiments of the present disclosure.

FIG. 22 depicts a MPBPH with a non-planar attachment surface, consistent with embodiments of the present disclosure. Embodiments of the present disclosure are directed toward the use of attachment surface(s) that can be specially designed in non-planar configurations. This can facilitate attachment to different, non-planar surfaces. For instance, it may be desirable to attach the MPBPH 2208 to a curved surface (such as a round pole 2202) or to an angled surface (such as the corner of a building). Consistent with certain embodiments, customized MPBPHs can be designed with an outer surface that has the desired shape, whether curved, angled or otherwise. FIG. 22 depicts alternate embodiments where a MPBPH 2208 with a relatively planer outer surface is modified by adding an attachment surface 2204 that has the desired shape (depicted here as curved). An interface piece 2206 can (optionally) connect the attachment surface 2204 to the MPBPH 2208.

It has been recognized that large scale uses of MPBPH devices by organizations such as the U.S. military can benefit from the use of modular components that can be readily replaced, changed and supplemented. For instance, certain types of reclosable fasteners can deteriorate from exposure to dirt, chemicals or environmental factor, and it can be important for a soldier to be able to quickly and securely replace damaged fasteners. The MPBPH device can be configured and arranged to allow a soldier to replace part or all of the reclosable fasteners while in the field, in seconds, and without tools.

The use of reclosable fasteners that are connected with adhesive can facilitate this action. For instance, damaged reclosable fasteners can be removed and replaced by pulling off (or scraping off) the reclosable fasteners, without having to scrap the entire MPBPH device.

Optional text, such as safety instructions, can be molded into the sides of the MPBPH. The section of the mold containing the instructions can be in the form of a removable plate that can be changed to accommodate different instructions, even different languages (sometimes referred to as a "slug").

Consistent with certain embodiments, a MPBPH device can be configured and designed to accommodate a strapping system that can serve a number of purposes, including securing a weapon within the MPBPH device. The handles can also been designed to withstand forces necessary to disengage the MPBPH device when engaged with a surface (e.g., with adhesives, Dual Lock or magnets). A soldier can disengage the MPBPH by pulling in an upward motion directly on a handle or the strap.

Various embodiments are directed toward a strapping system, which can use military spec/flame retardant hook-and-loop or Velcro material. The flame retardant properties can be particularly useful for use on ships and aircraft. A black molded plastic D Ring can be attached (e.g., heat welded) to one end of the strap. The other end can be rounded to prevent injuries from sharp edges. Extending twelve inches from the D ring, the strap is fabricated from Velcro-type loop material. Four inches of Velcro hook material can be attached (e.g., heat welded) to the end of the loop material.

To secure a weapon, the strap can be fed up through one of the slotted handles, placed over the top of the butt stock of the weapon and down through the other slotted handle. When the strap is pulled tight, the D ring can be designed to rest within the specially designed cavities on the outer edges of the MPBPH (behind/next to the slotted handles). To secure the strap, the rounded end is pulled tight and placed against the loop material over the sheath. To release the strap, the rounded end is pulled in an upward direction.

In addition to securing a weapon in the MPBPH, the strap can be used to disengage the MPBPH by pulling the strap in an upward motion when the unit is fastened by reclosable fasteners or magnets.

The following discussion provides further details of one or more experimental embodiments and is not necessarily limiting on various embodiments discussed herein.

The MPBPH can be molded using Santoprene or other resins. Santoprene has properties similar to vulcanized rubber and is strong enough to withstand being stepped on and having metal butt plates pushed into it repeatedly. Various components of the MPBPH can also be designed to function in extreme temperature ranges to assure proper functioning from Arctic to desert conditions. For instance, Santopreen meets the needs of temperature extremes faced by the military with a functional range from $-60°$ C. to $135°$ C. ($-81°$ F. to $275°$ F.) with no cracking or tackiness. Santoprene also has good resistance to many acids, bases and aqueous solutions. A dull black color and stealthy matte finish can be used to reduce the amount of reflected light, which can improve camouflage qualities. In other embodiments, different types of materials, such as thermoplastics or a mixture of (virgin) ABS resins and fiberglass can be used. If the materials are smooth, the exterior surfaces can be heavily textured to achieve a sandpaper-like texture for easy gripping even in wet conditions.

The MPBPH can be designed to be small enough and light enough to be portable for use in the field. In a vehicle or airplane, the strap can also be used to prevent a weapon from dislodging due to bumps or turbulence. Moreover, the strap can secure additional components such as a removal tool or covering piece, as discussed herein. The MPBPH can be semi-permanently attached to almost any surface for side by side use in any type of weapon storage equipment, unit or facility.

Weapons that are stored shipboard must often contend with rolling seas and engine vibration, conditions that regularly cause weapon damage. Newer ships are being made of lighter metals such as stainless steel and aluminum. Magnets will not work on these metals. The MPBPH's Dual Lock fastening system can be designed to work on these metals and the Velcro strap will help to secure weapons and minimize damage in rough weather.

Consistent with embodiments of the present disclosure, the design may employ multiple methods of securing the MPBPH to a wide range of surfaces. These methods include a fastener material such as 3M Dual Lock®, key slots, and magnets. A gripping material can also be used to resist sheering pressures. The combination of Dual Lock, magnets, gripping material and key slots allow the MPBPH to securely adhere to almost any surface under any condition. For instance, embodiments of the present disclosure recognize that the MPBPH can be used to secure a weapon/firearm on vertical, horizontal and sloped planes, and recognize that the MPBPH can be secured to almost any surface.

The MPBPH can be designed to facilitate the safe handling and storage of military and tactical weapons. For example, the MPBPH can be designed to secure a rifle in a wide range of conditions. Many of the MPBPH features can be specifically designed for use by members of the Armed Forces. These features can be also useful for other tactical organizations using weapons, e.g., Homeland Security, Border Patrol, state and local police departments, and SWAT teams.

Figure 23:
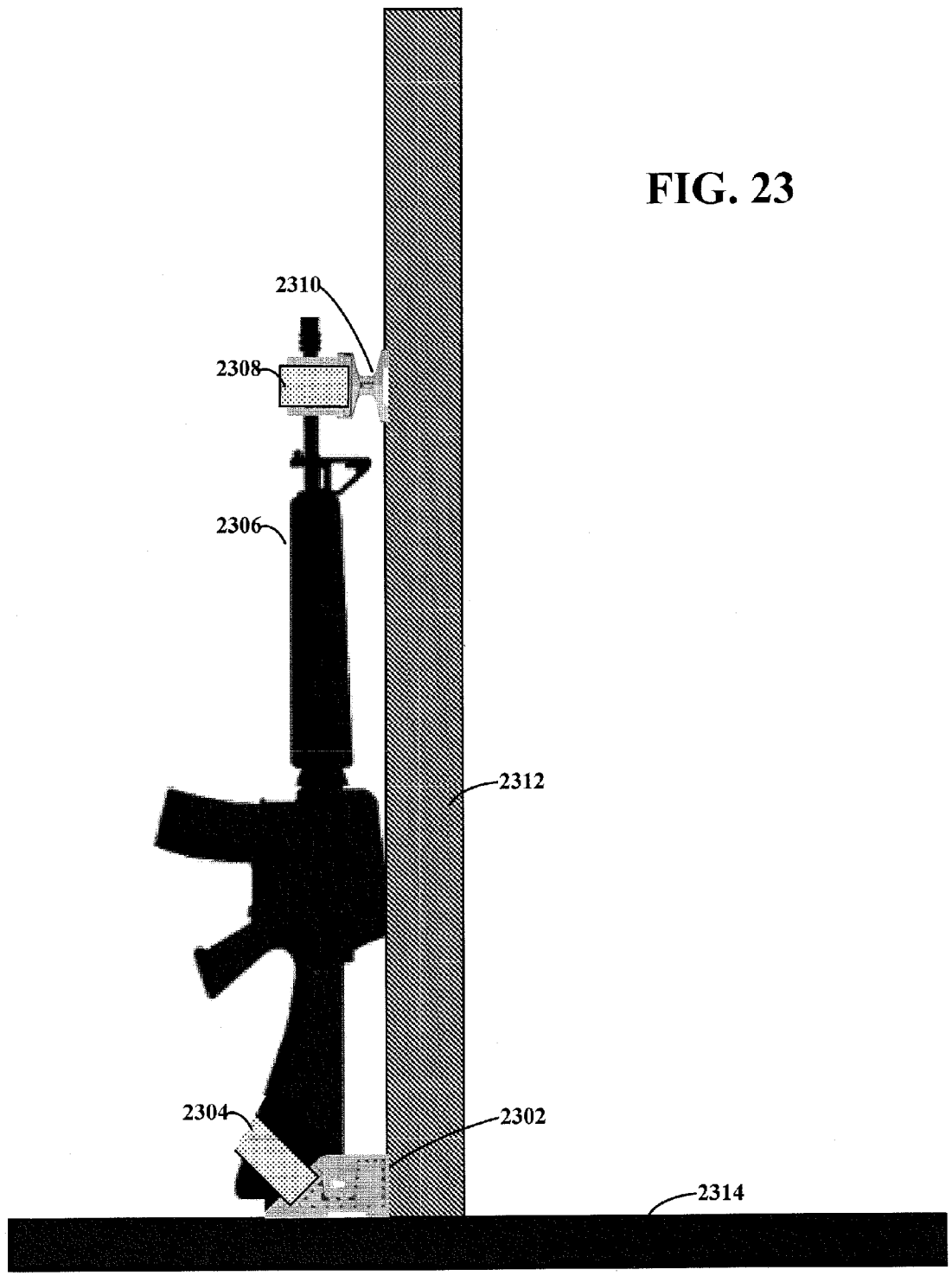
FIG. 23 depicts use of a system including both a MPWH and a MPWBH device against a vertical structure, consistent with embodiments of the present disclosure.

FIG. 23 depicts use of a system including both a MPWH and a MPWBH device against a vertical structure, consistent with embodiments of the present disclosure. The system shown in FIG. 23 includes both a MPWH device 2310 and a MPWBH device 2302. Together these devices can be used to secure firearm 2306 in a secure and efficient manner. Straps 2304 and 2308 can be used to provide additional stability and support. As discussed herein, each of the MPWH device 2310 and the MPWBH device 2302 can be designed with multiple securing options. This allows for the devices 2302, 2310 to be secured to various support structures (such as a wall 2312 and/or a floor 2314) in any of a number of different manners.

Consistent with certain embodiments, the MPWBH device 2302 can be secured in a semi-permanent manner using screws or nails. At the same time, the MPWH device 2310 can be secured using magnets or a reclosable fastener system. This can be particularly useful for allowing different soldiers to share the use of the MPWBH device 2302, while keeping and using their own MPWH device 2310. Moreover, this can facilitate the use of different sized firearms with the same MPWBH device 2302. For example, each time the MPWBH device 2302 is used, a solider can position their own MPWH device 2310 at the proper height for their firearm.

Consistent with embodiments of the present disclosure, the MPWBH device 2302 can be positioned further out from the wall 2312. This allows the firearm 2306 to be secured at a desired angle relative to the floor 2314.

Figure 24:
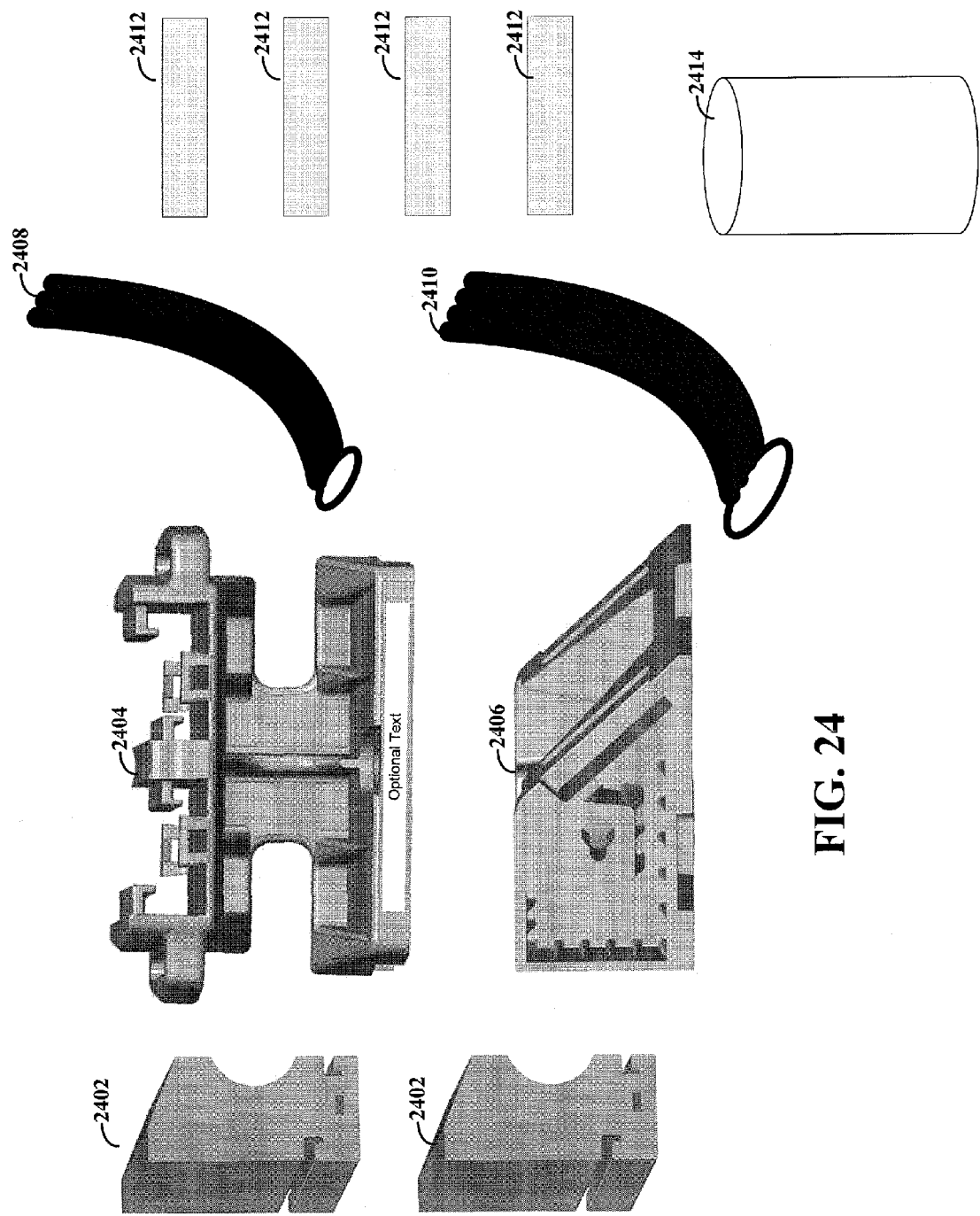
FIG. 24 depicts a kit for use in securing firearms, consistent with embodiments of the present disclosure.

FIG. 24 depicts a kit for use in securing firearms, consistent with embodiments of the present disclosure. The kit can include one or more of the depicted component elements. These elements include a MPWH base 2404. Two or more deformable pieces 2402 can be included. These deformable pieces 2402 can be configured and arranged to snap into place within the MPWH base 2404. A MPWBH device 2406 can also be part of the kit. One or more straps 2408 and 2410 can be included for use with MPWH base 2404 and/or MPWBH device 2406. In certain embodiments, these straps 2408 and 2410 can include D-rings and/or hook-and-loop fasteners.

Consistent with embodiments of the present disclosure, the kit can include components designed for use in attaching the MPWH base 2404 and/or MPWBH device 2406 to various support-structures. For instance, strips 2412 can be provided. One side of the strips 2412, an adhesive, can be covered by a peelable protective layer. The other side of the strips 2412 can include one half of a reclosable fastener system. The other half of the reclosable fastener system can be on the MPWH base 2404 and/or MPWBH device 2406. A user of the kit can remove the peelable protective layer, place the strips 2412 at desired locations and then bond the MPWH base 2404 and/or MPWBH device 2406 thereto.

The kit can also be configured to include cleaner 2414. This cleaner can be used to clean the support structure and/or the reclosable fastener system before the strips are used. For instance, cleaner 2414 can be a container with an isopropyl alcohol wipe to clean a surface before it is used.

FIG. 25 depicts a plurality of MPWH and MPWBH devices used together, consistent with embodiments of the present disclosure. In certain embodiments, MPWH devices 2504 and MPWBH devices 2502 can be designed with similar (or identical) outer diameter sizes. This allows for many MPWH devices 2504 and MPWBH devices 2502 to be easily aligned in a row while using as little space as possible.

Figure 26A:
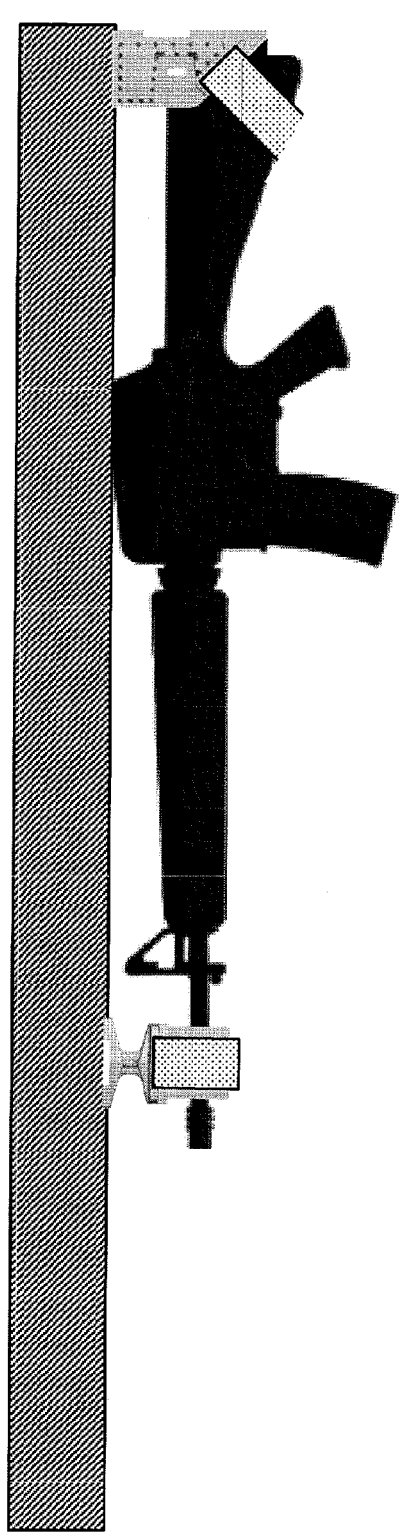
FIG. 26A depicts a use of MPWH and MPWBH devices that allow a firearm to be secured in a first horizontal manner, consistent with embodiments of the present disclosure.

FIG. 26A depicts a use of MPWH and MPWBH devices that allows a firearm to be secured in a first horizontal manner, consistent with embodiments of the present disclosure. FIG. 26A shows the flexibility and robust nature of embodiments of the systems of the present disclosure. In particular, the combination of strapping systems and multiple attachment options can allow for a firearm to be "hung" from the underside of a structure (e.g., underneath a table or from a ceiling).

Figure 26B:
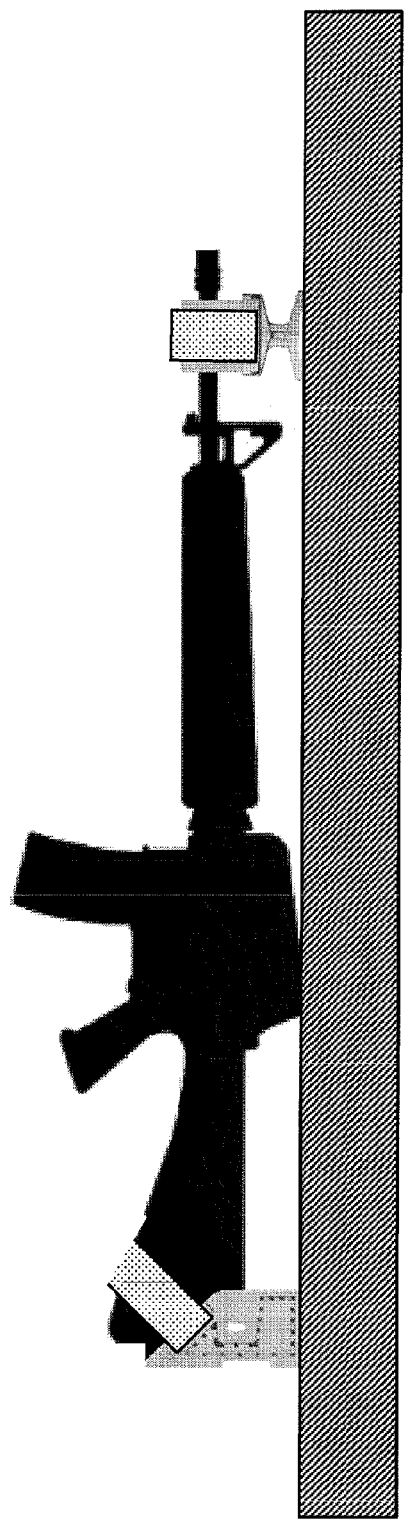
FIG. 26B depicts a use of MPWH and MPWBH devices that allow a firearm to be secured in a second horizontal manner, consistent with embodiments of the present disclosure.

FIG. 26B depicts a use of MPWH and MPWBH devices that allows a firearm to be secured in a second horizontal manner, consistent with embodiments of the present disclosure. The firearm can also be secured on the top of a horizontal structure (e.g., on the floor or the top of a table). Moreover, the use of a system that includes both MPWH and MPWBH devices can keep the firearm a few inches above the surface. This can be particularly useful for keeping the firearm clean when the surface is damp and/or dirty.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. For example, the methods, devices and systems discussed herein may be implemented in connection with various military environments and various types of applications. The disclosure may also be implemented using a variety of approaches such as those involving manufacturing variations and different uses of the various components of the system. Such modifications and changes do not depart from the true spirit and scope of the present disclosure, including that set forth in the following claims.

What is claimed is:

1. A firearm securing kit comprising:
   a barrel securing unit configured and arranged to secure a barrel of a firearm having a butt plate and including a securing mechanism configured and arranged to generate a holding force between the barrel securing unit and a surface of a support structure; and
   a butt plate securing unit configured and arranged to secure the butt plate of the firearm and including a securing mechanism configured and arranged to generate a holding force between a sidewall of the butt plate securing unit and the surface of the support structure, the sidewall forming an enclosure in which the butt plate is secured, the butt plate securing unit being configured and arranged with the barrel securing unit to secure the firearm to the support structure while the support structure is inclined at an angle at which gravity applies a force to the firearm in a direction away from the support structure, and while the butt plate securing unit is physically unattached from the barrel securing unit.

2. The kit of claim 1, further including a strap securing system configured and arranged to further secure the barrel of a firearm.

3. The kit of claim 1, further including a strap securing system configured and arranged to further secure the butt plate of a firearm.

4. The kit of claim 1, wherein the barrel securing unit includes one half of a reclosable fastener system designed to generate the holding force with another half of the reclosable fastener system.

5. The kit of claim 4, wherein the barrel securing unit further includes double sided strips having adhesive on one side and the other half of the reclosable fastener system on the other side.

6. The kit of claim 1, wherein the butt plate securing unit includes one half of a reclosable fastener system designed to generate the holding force with another half of the reclosable fastener system.

7. The kit of claim 6, wherein the butt plate securing unit further includes double sided strips having adhesive on one side and the other half of the reclosable fastener system on the other side.

8. The kit of claim 1, further including one or more deformable pieces configured and arranged to snap into the barrel securing unit and to secure a barrel of a firearm when snapped therein into the barrel securing unit.

9. The kit of claim 8, wherein the deformable pieces have an elasticity of sufficient pliability to allow removal of a firearm barrel without breaking the holding force of the barrel securing unit.

10. The kit of claim 1, wherein the barrel securing unit includes a recessed channel and half of reclosable fastener located in the recessed channel, and the reclosable fastener is configured and arranged to fasten to another half of the reclosable fastener located on a surface.

11. The kit of claim 1, wherein the butt plate securing unit includes a recessed channel and half of a reclosable fastener located in the recessed channel, and the reclosable fastener is configured and arranged to fasten to another half of the reclosable fastener located a surface.

12. A method of using a firearm securing system, the method comprising:
attaching a barrel securing unit to a first surface;
attaching a butt plate securing unit to a second surface;
securing a barrel of a firearm using the attached barrel securing unit;
securing a butt plate of the firearm using the attached butt plate securing unit;
removing the firearm from the butt plate securing unit;
removing the barrel securing unit from the first surface;
attaching the barrel securing unit to a third surface; and
securing the barrel of the firearm using the barrel securing unit as attached to the third surface.

13. The method of claim 12, wherein the step of attaching a barrel securing unit to a first surface includes the use of at least one of: using a reclosable fastener system and using magnets.

14. The method of claim 12, wherein the step of attaching a barrel securing unit includes attaching a first half of a reclosable fastener to the first surface using an adhesive.

15. The firearm securing kit of claim 1, wherein the barrel securing unit includes
a first platform having a first surface configured and arranged to interface with a surface of the support structure;
a second platform configured and arranged to couple to the barrel; and
a support piece extending between the first and second platforms along a direction that is about perpendicular to the first surface, the support piece is configured and arranged to provide space between the first and second platforms along said direction that is sufficient to accommodate a person's fingers to permit holding the support piece and to allow for application of pressure sufficient to generate the holding force.

16. The firearm securing kit of claim 1, wherein the butt plate securing unit includes:
a first sidewall having a first surface configured and arranged to secure the butt plate to a surface of the support structure,
second and third sidewalls connected to the first sidewall and extending away from the support structure in a direction that is about perpendicular to the first surface, the second and third sidewalls having inner surfaces that face one another, the first sidewall having an inner surface that faces a region between the inner surfaces of the second and third sidewalls and that adjoins the inner surfaces of the second and third sidewalls,
a fourth sidewall connected to the sidewalls and extending away from the support structure in a direction that is about perpendicular to the first surface, the fourth sidewall having an inner surface that faces a space bound by the inner surfaces of the first, second and third sidewalls, the inner surface of the fourth sidewall adjoining the inner surfaces of the first, second and third sidewalls and being configured and arranged with the inner surfaces of the first, second and third sidewalls to surround and support a butt of a firearm on four sides; and
a securing component configured and arranged to prevent removal of the butt of the firearm from between the sidewalls.

17. The firearm securing kit of claim 16, wherein
the first surface includes half of a reclosable fastener within a recessed channel of the first surface,
the reclosable fastener including stems extending away from a surface of the recessed channel and configured and arranged to engage with corresponding stems of another reclosable fastener that is located on the support structure, while the first sidewall is secured to the support structure with said surfaces being pressed against one another, and
the recessed channel and the half of the reclosable fastener being configured and arranged to provide the half of the reclosable fastener in a manner that is recessed into the channel and that facilitates the securing of the butt plate securing kit.

18. The firearm securing kit of claim 16, wherein the securing component is configured and arranged to prevent removal of the butt of the firearm by applying a force to a portion of the butt facing away from the support structure and using the applied force to press a portion of the butt facing the support structure to the inner surface of the first sidewall.

19. The firearm securing kit of claim 16, wherein the sidewalls are configured and arranged to:
support the firearm extending in a vertical orientation in which the firearm extends vertically from a bottom of the butt, in which the sidewalls are configured and arranged with one another to apply a first vertical force to the bottom of the butt via engagement of the butt with the inner surface of the fourth sidewall and mechanical coupling of the fourth sidewall to the support structure via the first, second and third sidewalls, the first vertical force supporting a preponderance of the weight of the firearm, and
support the firearm extending in a non-vertical orientation in which the firearm extends in a non-vertical direction, in which the sidewalls are configured and arranged with one another to apply a second vertical force to a sidewall of the butt via engagement of the sidewall butt with the inner surface of one of the first, second and third sidewalls and mechanical coupling thereof to the support structure via the first, second and third sidewalls, the vertical force supporting a preponderance of the weight of the firearm applied to the butt plate securing kit.

20. A firearm securing kit comprising:
a barrel securing unit configured and arranged to secure a barrel of a firearm having a butt plate and including a securing mechanism configured and arranged to generate a holding force between the barrel securing unit and a surface of a support structure, the barrel securing unit including a barrel interface configured and arranged to secure the barrel, the barrel interface having
a rigid protrusion,
a flexible structure coupled to the rigid protrusion and configured and arranged to flexibly secure the barrel to the barrel securing mechanism unit, and
wherein the securing mechanism of the barrel securing unit includes a first surface interface connected to the barrel interface and configured and arranged with the barrel first device interface to mitigate movement of the barrel securing unit and the barrel relative to the surface, by interfacing with the surface; and
a butt plate securing unit configured and arranged to secure the butt plate of the firearm and including a securing mechanism configured and arranged to generate a holding force between a sidewall of the butt plate securing unit and the surface of the support structure, the sidewall forming an enclosure in which the butt plate is secured, the butt plate securing unit being configured and arranged with the barrel securing unit to secure the firearm to the support structure while the support structure is inclined at an angle at which gravity applies a force to the firearm in a direction away from the support structure, and while the butt plate securing unit is physically unattached from the barrel securing unit, wherein the butt plate securing unit includes
a butt plate interface configured and arranged to secure the butt plate relative to the butt plate securing unit, and
a second surface interface connected to the butt plate interface and configured and arranged to mitigate movement of the butt plate securing unit and the butt plate, relative to the surface, by interfacing with the surface.

* * * * *